United States Patent
Nukariya et al.

(10) Patent No.: US 11,182,156 B2
(45) Date of Patent: Nov. 23, 2021

(54) SELECTIVELY CHANGING ARITHMETIC DATA TYPES USED IN ARITHMETIC EXECUTION OF DEEP LEARNING APPLICATIONS BASED ON EXPRESSIBLE RATIO AND FLUCTUATION VALUE COMPARISONS TO THRESHOLD VALUES

(71) Applicant: FUJITSU LIMITED, Kawasaki (JP)

(72) Inventors: Atsushi Nukariya, Kawagoe (JP); Masahiro Doteguchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 16/744,240

(22) Filed: Jan. 16, 2020

(65) Prior Publication Data
US 2020/0272461 A1    Aug. 27, 2020

(30) Foreign Application Priority Data
Feb. 26, 2019    (JP) .............................. JP2019-032730

(51) Int. Cl.
G06F 9/30    (2018.01)
G06F 7/483   (2006.01)
G06F 7/491   (2006.01)

(52) U.S. Cl.
CPC ............ G06F 9/3001 (2013.01); G06F 7/483 (2013.01); G06F 7/491 (2013.01); G06F 9/30014 (2013.01); G06F 9/30189 (2013.01)

(58) Field of Classification Search
CPC .................. G06F 9/30014; G06F 9/30189
See application file for complete search history.

(56) References Cited

U.S. PATENT DOCUMENTS

| | | | | |
|---|---|---|---|---|
| 2017/0061279 | A1* | 3/2017 | Yang | G06N 3/084 |
| 2019/0310864 | A1* | 10/2019 | Gutierrez | G06N 3/063 |
| 2019/0340492 | A1* | 11/2019 | Burger | G06N 3/08 |
| 2020/0143232 | A1* | 5/2020 | Ito | G06N 3/063 |

FOREIGN PATENT DOCUMENTS

| | | | |
|---|---|---|---|
| JP | 6-96048 A | 4/1994 | |
| JP | 8-36644 A | 2/1996 | |

OTHER PUBLICATIONS

Zhang, Wentai et al., "Adaptive-Precision Framework for SGD Using Deep Q-Learning", 2018 IEEE/ACM International Conference on Computer-Aided Design (ICCAD), ACM, 8 pages, Nov. 5, 2018 [retrieved on Dec. 24, 2018], XP033487800.

(Continued)

*Primary Examiner* — Jacob Petranek
(74) *Attorney, Agent, or Firm* — Fujitsu Patent Center

(57) ABSTRACT

An information processing apparatus includes: a memory; and a processor coupled to the memory and configured to: perform an arithmetic operation using an arithmetic operation target; repeat the arithmetic operation by using a calculated arithmetic operation result; obtain a ratio of, in a first number of elements which are included in the arithmetic operation result, a second number of elements in an expressible range as a predetermined-bit fixed point; and perform the arithmetic operation by using the predetermined-bit fixed point based on the ratio.

8 Claims, 20 Drawing Sheets

| ITERATION ID | RATIO OF TENSOR ELEMENT NUMBER THAT CAN BE EXPRESSED FROM DECIMAL POINT POSITION (%) | | | | |
|---|---|---|---|---|---|
| | ARITHMETIC OPERATION #1 | ARITHMETIC OPERATION #2 | ARITHMETIC OPERATION #3 | ARITHMETIC OPERATION #4 | ... |
| it1 | 20.6 | 12.3 | 11.4 | 70.2 | |
| it2 | 24.5 | 45.1 | 10.9 | 39.1 | |
| it3 | 34.9 | 29.3 | 8.6 | 28.1 | |
| it4 | 36.7 | 54.3 | 12.4 | 60.7 | |
| ⋮ | ⋮ | ⋮ | ⋮ | ⋮ | ... |
| it1501 | 40.7 | 99.1 | 39.2 | 97.4 | |
| it1502 | 45.0 | 100 | 16.3 | 99.2 | |
| it1503 | 47.3 | 99.8 | 45.0 | 98.1 | |
| it1504 | 46.5 | 99.2 | 90.2 | 100 | |

701   702   703   704

(56) References Cited

OTHER PUBLICATIONS

Kung, Jaeha et al., "Dynamic Approximation with Feedback Conlrol for Energy-Efficient Recurrent Neural Network Hardware", Low Power Electronics and Design, ACM, 6 pages, Aug. 8, 2016, XP058276478.
Extended European Search Report dated Jun. 3, 2020 for corresponding European Patent Application No. 20151930.3, 7 pages.
European Office Action dated Aug. 19, 2021 for corresponding European Patent Application No. 20151930.3, 7 pages.

* cited by examiner

FIG. 4

| ARITHMETIC ID | ARITHMETIC DATA TYPE |
|---|---|
| #1 | 32-bit FLOATING POINT |
| #2 | 8-bit FIXED POINT |
| #3 | 8-bit FIXED POINT |
| #4 | 8-bit FIXED POINT |
| ⋮ | ⋮ |

| ITERATION ID | ARITHMETIC ID | RATIO (%) |
|---|---|---|
| it1 | #1 | 20.6 |
| it2 | #2 | 12.3 |
| it3 | #3 | 11.4 |
| it4 | #4 | 70.2 |
| ⋮ | ⋮ | ⋮ |
| it1501 | #1 | 40.7 |
| it1502 | #2 | 99.1 |
| it1503 | #3 | 39.2 |
| it1504 | #4 | 97.4 |
| ⋮ | ⋮ | ⋮ |

FIG. 6

| ITERATION ID | RATIO OF TENSOR ELEMENT NUMBER THAT CAN BE EXPRESSED FROM DECIMAL POINT POSITION (%) | | | | |
| --- | --- | --- | --- | --- | --- |
| | ARITHMETIC OPERATION #1 | ARITHMETIC OPERATION #2 | ARITHMETIC OPERATION #3 | ARITHMETIC OPERATION #4 | ... |
| it1 | 20.6 | 12.3 | 11.4 | 70.2 | |
| it2 | 24.5 | 45.1 | 10.9 | 39.1 | |
| it3 | 34.9 | 29.3 | 8.6 | 28.1 | |
| it4 | 36.7 | 54.3 | 12.4 | 60.7 | |
| ... | ... | ... | ... | ... | ... |
| it1501 | 40.7 | 99.1 | 39.2 | 97.4 | |
| it1502 | 45.0 | 100 | 16.3 | 99.2 | |
| it1503 | 47.3 | 99.8 | 45.0 | 98.1 | |
| it1504 | 46.5 | 99.2 | 90.2 | 100 | |
| | 701 | 702 | 703 | 704 | |

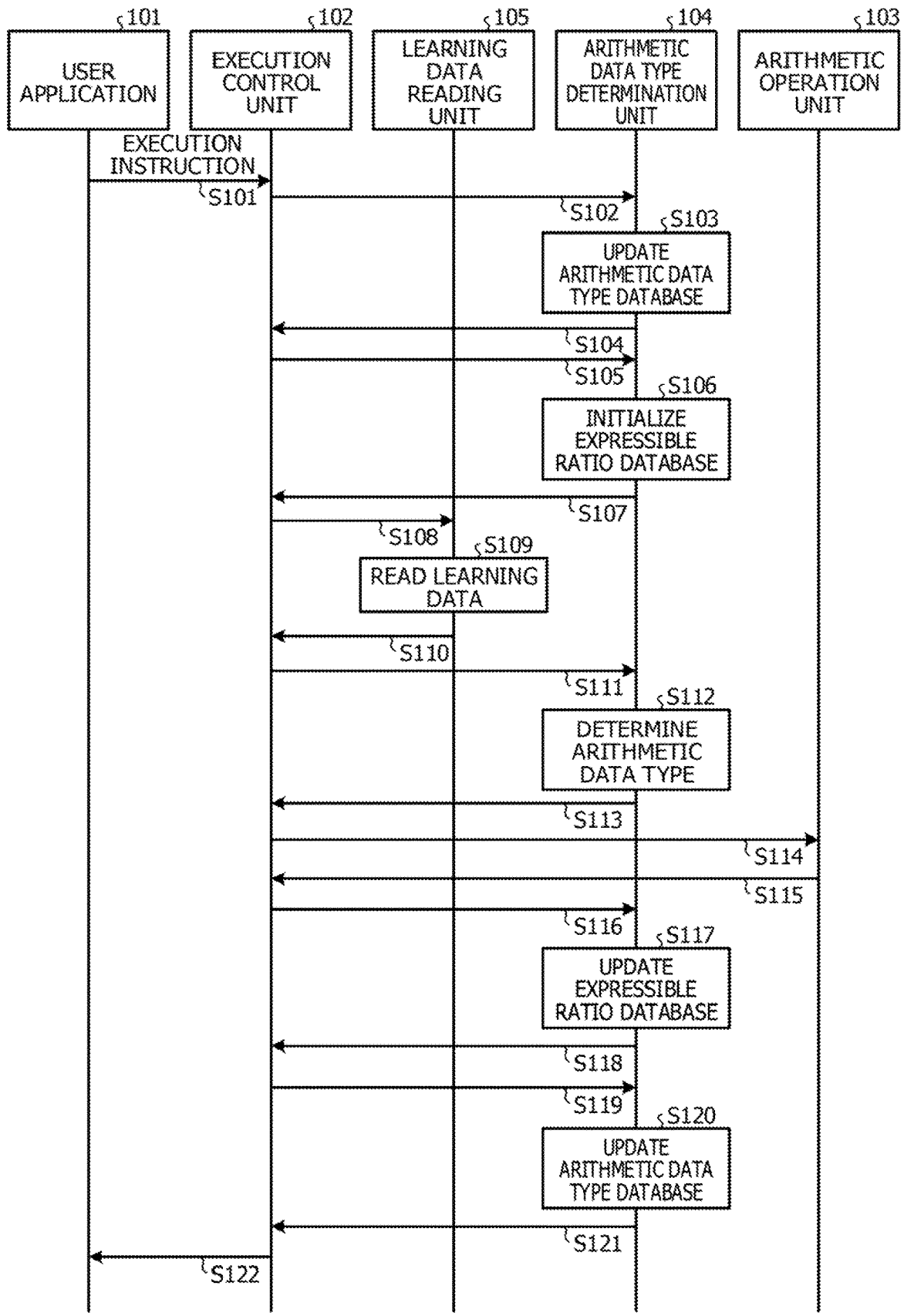

FIG. 10

| ITERATION ID | ARITHMETIC ID | RATIO (8-bit FIXED POINT) (%) | RATIO (16-bit FIXED POINT) (%) |
|---|---|---|---|
| it1 | #1 | 20.6 | 40.5 |
| it1 | #2 | 11.4 | 70.2 |
| it1 | #3 | 9.3 | 9.3 |
| ... | ... | ... | ... |
| it1501 | #1 | 40.7 | 99.1 |
| it1501 | #2 | 96.3 | 97.4 |
| it1501 | #3 | 19.1 | 21.0 |
| ... | ... | ... | ... |

| ARITHMETIC ID | ARITHMETIC DATA TYPE |
|---|---|
| #1 | 32-bit FLOATING POINT |
| #2 | 8-bit FIXED POINT |
| #3 | 16-bit FIXED POINT |
| ⋮ | ⋮ |

| ITERATION ID | ARITHMETIC OPERATION #1 | | ARITHMETIC OPERATION #2 | | ARITHMETIC OPERATION #3 | | ... |
| --- | --- | --- | --- | --- | --- | --- | --- |
| | 8-bit EXPRESSIBLE RATIO | 16-bit EXPRESSIBLE RATIO | 8-bit EXPRESSIBLE RATIO | 16-bit EXPRESSIBLE RATIO | 8-bit EXPRESSIBLE RATIO | 16-bit EXPRESSIBLE RATIO | |
| it1 | 20.6 | 40.5 | 11.4 | 70.2 | 9.3 | 10.2 | |
| it2 | 24.5 | 50.2 | 10.9 | 39.1 | 14.3 | 32.2 | |
| it3 | 34.9 | 55.3 | 8.6 | 28.1 | 8.2 | 20.1 | |
| it4 | 36.7 | 59.1 | 12.4 | 60.7 | 3.1 | 9.5 | |
| ... | ... | ... | ... | ... | ... | ... | ... |
| it1501 | 40.7 | 99.1 | 96.3 | 97.4 | 19.1 | 21.0 | |
| it1502 | 45.0 | 100 | 99.0 | 99.2 | 36.9 | 40.1 | |
| it1503 | 47.3 | 99.8 | 97.0 | 98.1 | 11.0 | 20.2 | |
| it1504 | 46.5 | 99.2 | 97.2 | 100 | 96.9 | 99.3 | |

RATIO OF TENSOR ELEMENT NUMBER THAT CAN BE EXPRESSED FROM DECIMAL POINT POSITION (%)

FIG. 15

| ITERATION ID | RATIO OF TENSOR ELEMENT NUMBER THAT CAN BE EXPRESSED FROM DECIMAL POINT POSITION (%) 172 | | | | | |
|---|---|---|---|---|---|---|
| | ARITHMETIC OPERATION #1 | | ARITHMETIC OPERATION #2 | | ARITHMETIC OPERATION #3 | |
| | 8-bit EXPRESSIBLE RATIO | 16-bit EXPRESSIBLE RATIO | 8-bit EXPRESSIBLE RATIO | 16-bit EXPRESSIBLE RATIO | 8-bit EXPRESSIBLE RATIO | 16-bit EXPRESSIBLE RATIO |
| ... | ... | ... | ... | ... | ... | ... |
| it1501 | 20.6 | 60.2 | 96.3 | 97.4 | 95.3 | 96.4 |
| it1502 | 24.5 | 95.2 | 99.0 | 99.2 | 99.4 | 97.2 |
| it1503 | 34.9 | 95.0 | 97.0 | 98.1 | 97.3 | 97.8 |
| it1504 | 36.7 | 93.2 | 97.2 | 100 | 94.3 | 94.9 |
| it1505 | 40.7 | 99.1 | 97.3 | 100 | 93.2 | 95.3 |
| it1506 | 45.0 | 100 | 96.5 | 100 | 60.3 | 93.4 |
| it1507 | 47.3 | 78.6 | 97.3 | 99.9 | 60.4 | 92.1 |
| it1508 | 46.5 | 68.4 | 98.5 | 99.8 | 55.4 | 91.6 |

# SELECTIVELY CHANGING ARITHMETIC DATA TYPES USED IN ARITHMETIC EXECUTION OF DEEP LEARNING APPLICATIONS BASED ON EXPRESSIBLE RATIO AND FLUCTUATION VALUE COMPARISONS TO THRESHOLD VALUES

CROSS-REFERENCE TO RELATED APPLICATION

This application is based upon and claims the benefit of priority of the prior Japanese Patent Application No. 2019-32730, filed on Feb. 26, 2019, the entire contents of which are incorporated herein by reference.

FIELD

The embodiments discussed herein are related to an information processing apparatus, a control method for the information processing apparatus, and a control program for the information processing apparatus.

BACKGROUND

In recent years, as deep learning and machine learning attract attention, a processor that can perform an arithmetic operation performed in learning at high speed attracts attention.

Japanese Laid-open Patent Publication No. 06-96048 and Japanese Laid-open Patent Publication No. 08-36644 are disclosed as related art.

SUMMARY

According to an aspect of the embodiments, an information processing apparatus includes: a memory; and a processor coupled to the memory and configured to: perform an arithmetic operation using an arithmetic operation target; repeat the arithmetic operation by using a calculated arithmetic operation result; obtain a ratio of, in a first number of elements which are included in the arithmetic operation result, a second number of elements in an expressible range as a predetermined-bit fixed point; and perform the arithmetic operation by using the predetermined-bit fixed point based on the ratio.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram of an example of registration information in an arithmetic data type database according to the first embodiment;

FIG. 5 is a diagram of an example of registration information in an expressible ratio database according to the first embodiment;

FIG. 6 is a diagram for explaining arithmetic data type determination processing according to the first embodiment;

FIG. 7 is a sequence diagram of the arithmetic data type determination processing by the information processing apparatus according to the first embodiment;

FIG. 10 is a diagram of an example of registration information in an expressible ratio database according to a second embodiment;

FIG. 11 is a diagram of an example of registration information in an arithmetic data type database according to the second embodiment;

FIG. 12 is a diagram for explaining arithmetic data type determination processing according to the second embodiment;

FIG. 15 is a diagram for explaining arithmetic data type transition;

DESCRIPTION OF EMBODIMENTS

Figure 1:
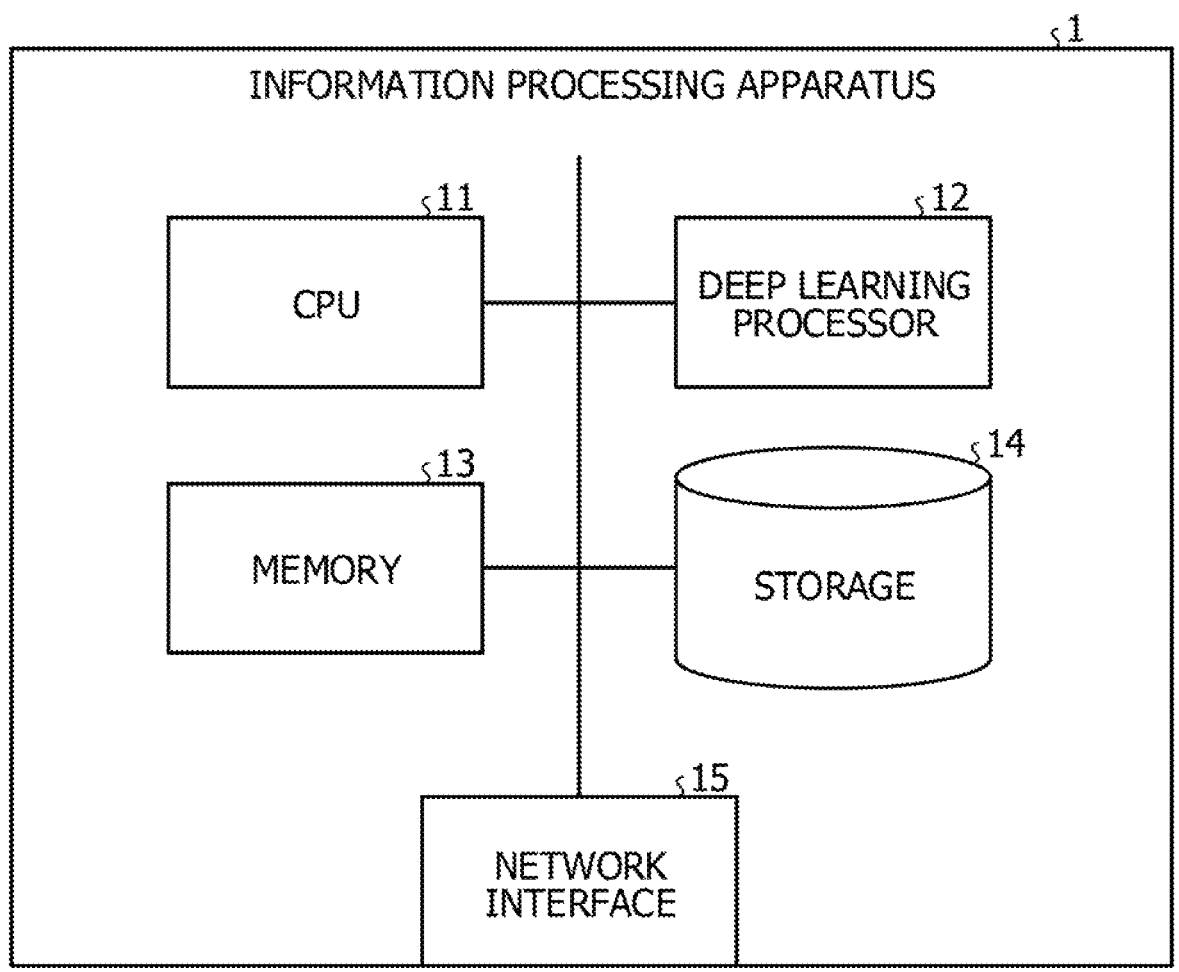
FIG. 1 is a hardware configuration diagram of an information processing apparatus.

Hereinafter, there is a case where deep learning and machine learning are collectively referred to as learning. A Graphics Processing Unit (GPU) that can perform tensor operations in parallel and accelerate the arithmetic operation particularly attracts attention from among the processors used for learning. However, the GPU is a processor that is developed in order to execute 3 Dimension (D) graphics processing and is not optimized for learning. Therefore, when performing learning, the GPU performs an arithmetic operation using a 32-bit floating point regardless of a stage of the processing. From this, in consideration of an index of electric power performance, it can be said that the GPU has room for optimization with respect to learning.

Under such a situation, various companies have developed processors that are optimized for learning. The arithmetic operation of learning is mainly a tensor operation which is not different from a tensor operation performed in the 3D graphic processing. However, deep learning and machine learning have a feature in which a variation in values of arithmetic operation elements used for the tensor operation decreases as learning is proceeded. Focusing on special properties of the arithmetic operation performed in such learning, companies have introduced a processor that performs inference operations with 8-bit integers and a processor that performs learning operations with 16-bit floating points for machine learning. A goal of these processors is to improve an electric power performance by deteriorating arithmetic operation accuracy and performing the arithmetic operation.

Moreover, hardware exists that performs an arithmetic operation with a 32-bit floating point in previous learning that is a first half phase of a learning arithmetic operation loop and switches the arithmetic operation to a learning arithmetic operation with 8-bit integers at the time when the previous learning is completed. This hardware uses the 8-bit integer as a fixed point and determines the decimal point position from an output result at the time of the learning arithmetic operation in a previous iteration. The iteration means a single loop of the learning arithmetic operation for determining a parameter in learning that is repeatedly performed. With this operation, it is not necessary to perform arithmetic operations twice, i.e., an arithmetic operation to determine a decimal point position and an arithmetic operation after the determination of the decimal point position, and the number of times of arithmetic operations is reduced. Furthermore, there is a typical technology that acquires image data as concentration data or binarized data, performs learning and recognition, and accelerates image recognition.

However, arithmetic operation accuracy of the processor that has been developed for deep learning and machine learning is determined in advance depending on hardware, and it is difficult to cope with the feature of learning such that a change in a value of an arithmetic operation element used for an arithmetic operation decreases as learning is proceeded. Therefore, it is difficult for the processor that has been developed for deep learning and machine learning to improve a learning efficiency.

Furthermore, the hardware that switches the arithmetic operation with the 32-bit floating point to the learning arithmetic operation with the 8-bit integers at the time when the previous learning is completed does not switch the arithmetic operation during learning. Therefore, it is difficult for the hardware to cope with the change in the value of the arithmetic operation element in the arithmetic operation during learning. Therefore, even if such hardware is used, it is difficult to improve the learning efficiency. Furthermore, even if the typical technology that that acquires image data as concentration data or binarized data and performs learning and recognition is used, it is difficult to cope with the change in the value of the arithmetic operation element in the arithmetic operation during learning, and there is a possibility that the learning efficiency is deteriorated.

Moreover, in a case where the 8-bit fixed point is used after a predetermined stage of the previous learning in which the decimal point position is largely changed, there is a possibility that learning is not proceeded due to the large change in the decimal point position. Therefore, in order to avoid stagnation of learning, a method is considered for determining the number of learning arithmetic operation loops by a user by trial and error as a timing for switching to the arithmetic operation using the 8-bit fixed point. However, it is difficult for the user to designate the number of learning arithmetic operation loops to set an appropriate switching timing, and there is a possibility that the learning efficiency of machine learning is deteriorated.

An information processing apparatus, a control method for the information processing apparatus, and a control program for the information processing apparatus that improve a learning efficiency of deep learning and machine learning may be provided.

Embodiments of an information processing apparatus, a control method for the information processing apparatus, and a control program for the information processing apparatus disclosed in the present application will be described in detail below with reference to the drawings. Note that the information processing apparatus, the control method for the information processing apparatus, and the control program for the information processing apparatus disclosed in the present application are not limited to the following embodiments.

First Embodiment

FIG. 1 is a hardware configuration diagram of an information processing apparatus. An information processing apparatus 1 performs deep learning. The information processing apparatus 1 that performs deep learning will be described below. However, an information processing apparatus that performs machine learning has a similar function. There is a case where the information processing apparatus 1 is referred to as a node. As illustrated in FIG. 1, the information processing apparatus 1 includes a Central Processing Unit (CPU) 11, a deep learning processor 12, a memory 13, a storage 14, and a network interface 15.

The CPU 11 performs an arithmetic operation that is not performed by the deep learning processor 12. For example, the CPU 11 executes system program processing and the like.

The deep learning processor 12 is a processor specialized for an arithmetic operation of deep learning. The deep learning processor 12 can perform a deep learning arithmetic operation at higher speed than the CPU 11.

The memory 13 is a volatile memory. The memory 13 temporarily holds learning data read from the storage 14 until the data is read to a processor for deep learning and is transferred.

The storage 14 is a nonvolatile memory such as a Hard Disk Drive (HDD) or a Solid State Drive (SSD). The storage 14 stores data used when deep learning is performed by the information processing apparatus 1.

The network interface 15 is an interface to connect to another information processing apparatus 1 via Ethernet (registered trademark) or InfiniBand (registered trademark). The network interface 15 relays transmission and reception of data between the CPU 11 and a CPU 11 mounted in the other information processing apparatus 1.

Figure 2:
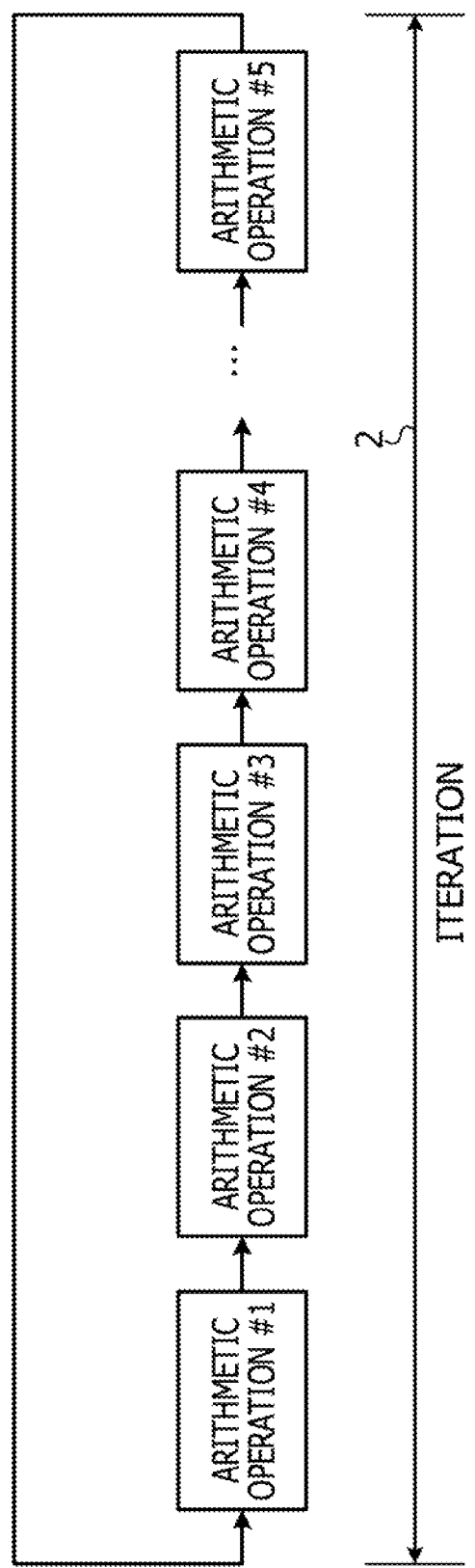
FIG. 2 is a diagram for explaining a process of learning.

The information processing apparatus 1 performs deep learning by using a multilayer neural network as illustrated in FIG. 2. FIG. 2 is a diagram for explaining a process of learning. The information processing apparatus 1 enhances recognition accuracy by repeating an arithmetic operation in each layer. For example, as illustrated in FIG. 2, in a case where arithmetic operations #1 to #N are performed in the respective layers, the information processing apparatus 1 repeats the arithmetic operations #1 to #N by using learning data. Here, as illustrated in FIG. 2, a learning period 2 in which the arithmetic operations #1 to #N are performed once in the repetition is referred to as an iteration. For example, the information processing apparatus 1 completes deep learning by repeating the iteration a plurality of times.

Figure 3:
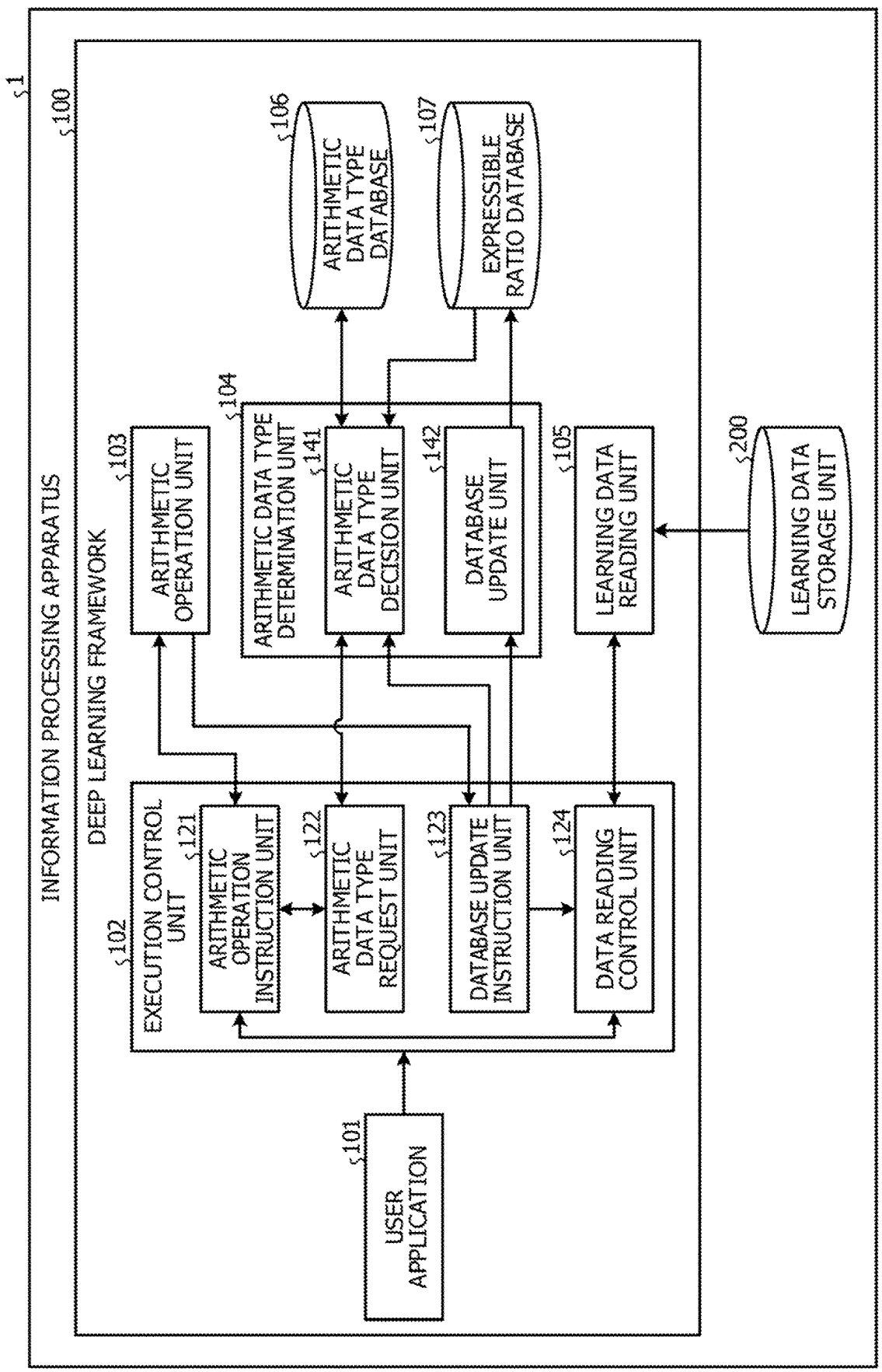
FIG. 3 is a block diagram of an information processing apparatus according to a first embodiment.

Next, a function of deep learning of the information processing apparatus 1 according to the present embodiment will be described with reference to FIG. 3. FIG. 3 is a block diagram of the information processing apparatus according to the first embodiment.

As illustrated in FIG. 3, the information processing apparatus 1 includes a deep learning framework 100 and a learning data storage unit 200. The learning data storage unit 200 is implemented by, for example, the storage 14 illustrated in FIG. 1. The learning data storage unit 200 stores a plurality of pieces of learning data used in deep learning in advance.

The deep learning framework 100 is a software library group developed to easily create a deep learning application.

The deep learning framework 100 is implemented by the CPU 11, the deep learning processor 12, and the memory 13 illustrated in FIG. 1.

The deep learning framework 100 includes a user application 101, an execution control unit 102, an arithmetic operation unit 103, an arithmetic data type determination unit 104, a learning data reading unit 105, an arithmetic data type database 106, and an expressible ratio database 107. For example, functions of the user application 101, the execution control unit 102, the arithmetic data type determination unit 104, and the learning data reading unit 105 are implemented by the CPU 11. A function of the arithmetic operation unit 103 is implemented by the deep learning processor 12. Furthermore, the arithmetic data type database 106 and the expressible ratio database 107 are disposed in the memory 13.

The user application 101 is a deep learning application created by an operator. The user application 101 instructs the execution control unit 102 to perform deep learning.

The arithmetic data type database 106 is a database in which one of arithmetic data types of 32-bit floating point or 8-bit fixed point used in each arithmetic operation included in each layer is registered. FIG. 4 is a diagram of an example of registration information of an arithmetic data type database according to the first embodiment. As illustrated in FIG. 4, the arithmetic data type database 106 holds an arithmetic data type used in each arithmetic operation in association with an arithmetic Identification (ID). The arithmetic ID is identification information that is uniquely set with respect to each arithmetic operation performed during one iteration. For example, in a state of FIG. 4, a 32-bit floating point is used in the arithmetic operation #1. Furthermore, 8-bit fixed points are used in the arithmetic operations #2 to #4.

The expressible ratio database 107 is a database in which a ratio of a tensor element number that can be expressed by the 8-bit fixed point by using a predetermined decimal point position of the tensor element number included in the arithmetic operation result in each iteration is registered. Here, the tensor element number is a value of each element included in an arithmetic operation target used for a tensor operation performed in each layer in each iteration. The arithmetic operation target is an operand such as a numerical value or a matrix used for the arithmetic operation. For example, in a case where a k*k matrix is an arithmetic operation target in the tensor arithmetic operation, each of k*k matrix elements included in the k*k matrix is the tensor element number.

FIG. 5 is a diagram of an example of registration information in an expressible ratio database according to the first embodiment. As illustrated in FIG. 5, in the expressible ratio database 107, the arithmetic ID and the ratio are registered in association with an iteration ID. The iteration ID is an identifier that is uniquely set for each iteration at a learning stage of deep learning. For example, in the expressible ratio database 107 illustrated in FIG. 5, a ratio of a tensor element number that can be expressed from a decimal point position in a case where an 8-bit fixed point included in an arithmetic operation result of an arithmetic operation #1 in an iteration having the iteration ID of it1 is used is 20.6%. Hereinafter, the ratio of the tensor element number that can be expressed from the decimal point position in a case where an 8-bit fixed point is used is referred to as an "expressible ratio".

The execution control unit 102 integrally controls processing of deep learning. The execution control unit 102 includes an arithmetic operation instruction unit 121, an arithmetic data type request unit 122, a database update instruction unit 123, and a data reading control unit 124.

Upon receiving an input of an instruction to perform deep learning from the user application 101, the database update instruction unit 123 instructs an arithmetic data type decision unit 141 of the arithmetic data type determination unit 104 to initialize the arithmetic data type database 106. Furthermore, the database update instruction unit 123 instructs the arithmetic data type decision unit 141 of the arithmetic data type determination unit 104 to initialize the expressible ratio database 107.

Next, the database update instruction unit 123 outputs a notification of completion of database initialization to the data reading control unit 124. Thereafter, the database update instruction unit 123 acquires an arithmetic operation result from the arithmetic operation unit 103 each time when each arithmetic operation in each iteration is terminated. Then, the database update instruction unit 123 outputs the acquired arithmetic operation result to the database update unit 142 and instructs to update the expressible ratio database 107.

The data reading control unit 124 receives an input of the notification of the completion of the database initialization from the database update instruction unit 123. Moreover, the data reading control unit 124 receives a request for acquiring learning data used for learning from the arithmetic operation instruction unit 121. Then, the data reading control unit 124 instructs the learning data reading unit 105 to read the learning data used for learning. Thereafter, the data reading control unit 124 acquires the learning data used for learning from the learning data reading unit 105. Then, the data reading control unit 124 outputs the acquired learning data to the arithmetic operation instruction unit 121.

Thereafter, the data reading control unit 124 receives a request for acquiring the learning data from the arithmetic operation instruction unit 121 each time when the iteration is terminated. Then, the data reading control unit 124 instructs the learning data reading unit 105 to read the learning data and acquires the learning data for each iteration, and outputs the acquired learning data to the arithmetic operation instruction unit 121.

The arithmetic operation instruction unit 121 acquires the instruction to perform deep learning input from the user application 101. Then, the arithmetic operation instruction unit 121 executes following processing at the time when each iteration is started.

The arithmetic operation instruction unit 121 outputs the request for acquiring the learning data used for learning to the data reading control unit 124. Then, the arithmetic operation instruction unit 121 receives an input of the learning data from the data reading control unit 124 as a response to the acquisition request.

Next, the arithmetic operation instruction unit 121 outputs an arithmetic data type transmission request to the arithmetic data type request unit 122. Thereafter, the arithmetic operation instruction unit 121 acquires the input of the arithmetic data type used in each arithmetic operation in the next iteration from the arithmetic data type request unit 122 as a response to the transmission request. For example, the 32-bit floating points are used in all the arithmetic operations in the first iteration. Thereafter, the arithmetic operation instruction unit 121 outputs the learning data and the arithmetic data type used in each arithmetic operation to the arithmetic operation unit 103 and further instructs to perform an arithmetic operation.

Thereafter, the arithmetic operation instruction unit 121 receives an input of an iteration completion notification from the arithmetic operation unit 103. Then, the arithmetic operation instruction unit 121 repeats processing for acquiring the learning data and the arithmetic data type and making the arithmetic operation unit 103 perform the arithmetic operation.

The arithmetic operation instruction unit 121 makes the arithmetic operation unit 103 repeat the arithmetic operation in each layer for each iteration until deep learning is completed. Here, in a case where a predetermined condition is satisfied, for example, in a case where a predetermined number of times of iteration are terminated or in a case where the recognition accuracy exceeds 90%, the arithmetic operation instruction unit 121 determines that deep learning is completed. The recognition accuracy is acquired by executing recognition processing by using test data each time when the predetermined number of times of iteration are completed.

The arithmetic data type request unit 122 receives the input of the arithmetic data type transmission request from the arithmetic operation instruction unit 121. Then, the arithmetic data type request unit 122 requests the arithmetic data type decision unit 141 to acquire the arithmetic data type. Thereafter, the arithmetic data type request unit 122 receives the input of the arithmetic data type to be used in each arithmetic operation in the next iteration from the arithmetic data type decision unit 141. Then, the arithmetic data type request unit 122 outputs the acquired arithmetic data type to be used in each arithmetic operation in the next iteration to the arithmetic operation instruction unit 121.

The arithmetic operation unit 103 receives an input of the learning data from the arithmetic operation instruction unit 121 at the start of each iteration. Moreover, the arithmetic operation unit 103 receives the input of the arithmetic data type to be used in each arithmetic operation in the next iteration from the arithmetic operation instruction unit 121. In the first iteration, the arithmetic operation unit 103 receives an instruction to use a 32-bit floating point as the arithmetic data type to be used in each arithmetic operation from the arithmetic operation instruction unit 121. Then, the arithmetic operation unit 103 performs each arithmetic operation by using the 32-bit floating point in each arithmetic operation using the learning data as an input and terminates the first iteration. Thereafter, the arithmetic operation unit 103 outputs an arithmetic operation result of each arithmetic operation to the database update instruction unit 123. Furthermore, when all the arithmetic operations included in the iteration are completed, the arithmetic operation unit 103 outputs the iteration completion notification to the arithmetic operation instruction unit 121. The arithmetic operation unit 103 repeats arithmetic operation processing until the instruction to perform the arithmetic operation from the arithmetic operation instruction unit 121 is stopped.

The arithmetic data type determination unit 104 includes the arithmetic data type decision unit 141 and the database update unit 142.

The database update unit 142 receives an instruction to initialize the expressible ratio database 107 from the database update instruction unit 123. Then, the database update unit 142 deletes all the registration information in the expressible ratio database 107 and initializes the expressible ratio database 107.

Thereafter, the database update unit 142 receives an input of the arithmetic operation result of each arithmetic operation each time when the iteration is completed from the database update instruction unit 123. Then, the database update unit 142 determines an appropriate decimal point position to express each tensor element number included in the arithmetic operation result of each arithmetic operation. Thereafter, the database update unit 142 determines whether or not the each tensor element number included in the arithmetic operation result of each arithmetic operation can be expressed by using the 8-bit fixed point at the determined decimal point position. This 8-bit fixed point is an example of a "predetermined-bit fixed point".

Next, the database update unit 142 calculates a ratio of the tensor element number that can be expressed by using an 8-bit fixed point from the determined decimal point position in the arithmetic operation result of each arithmetic operation. Thereafter, the database update unit 142 registers the expressible ratio, which is the ratio of the tensor element number that can be expressed by using the 8-bit fixed point from the determined decimal point position in each arithmetic operation for each iteration, to the expressible ratio database 107.

Here, calculation of the expressible ratio by the database update unit 142 will be described in detail. In a case where the decimal point position is $Q_8$, $Q_8$ is determined by the following formula (1).

[Mathematical Formula 1]

$$Q_8 = 8 - \text{ceil}(\log_2 \max(|x \min|, x \max)) - 1 \qquad (1)$$

The reference x min indicates a minimum value of the tensor element number. Furthermore, the reference x max indicates a maximum value of the tensor element number. Then, the ceil(X) is a function for obtaining a smallest integer that exceeds X. For example, the decimal point position $Q_8$ is calculated by a value obtained by subtracting the number of bits in the integer part in a case where a larger one of an absolute value of the minimum value of the tensor element number or the maximum value of the tensor element number is represented by a binary number and one bit of a sign bit from eight bits. In this case, a range R of a value that can be expressed by the decimal point position $Q_8$ is of $-128 \times 2^{-Q}$ to $127 \times 2^{-Q}$.

Therefore, a ratio P of the tensor element number that can be expressed is calculated by the following formula (2) in which the tensor element number is N.

[Mathematical Formula 2]

$$P_8 = \frac{\text{THE NUMBER OF TENSOR ELEMENTS OF WHICH VALUE IS WITHIN RANGE } R_8}{N} \qquad (2)$$

For example, the database update unit 142 calculates the expressible ratio in each arithmetic operation from the formula (2) by using the range R in a case of the decimal point position $Q_8$ obtained by the formula (1).

The arithmetic data type decision unit 141 receives the instruction to initialize the arithmetic data type database 106 from the database update instruction unit 123. Then, the arithmetic data type decision unit 141 registers the arithmetic data type to be used in each arithmetic operation to the arithmetic data type database 106 as a 32-bit floating point and initializes the arithmetic data type database 106.

Thereafter, the arithmetic data type decision unit 141 receives a request for transmitting the arithmetic data type of each arithmetic operation from the arithmetic data type request unit 122. Next, the arithmetic data type decision unit 141 confirms the arithmetic data type database 106 and acquires a current arithmetic data type of each arithmetic operation. Then, the arithmetic data type decision unit 141 specifies an arithmetic operation in which the 8-bit fixed point has been already set as the arithmetic data type. The arithmetic data type decision unit 141 notifies an 8-bit fixed point of the specified arithmetic operation, in which the 8-bit fixed point has been already set as the arithmetic data type, of the arithmetic data type request unit 122 as the arithmetic data type.

On the other hand, regarding the arithmetic operation in which the 32-bit floating point is set as the arithmetic data type, the arithmetic data type decision unit 141 acquires an expressible ratio of an iteration within a determination range from the latest iteration from the expressible ratio database 107.

For example, with reference to FIG. 6, a case will be described where the 1504 times of iterations have been terminated at that time. FIG. 6 is a diagram for explaining arithmetic data type determination processing according to the first embodiment. A table 170 in FIG. 6 is a table in which the expressible ratio database 107 is rearranged for easy understanding.

For example, in a case where the determination range is four times of iterations, the arithmetic data type decision unit 141 acquires an expressible ratio in use ranges 71 to 74 in FIG. 6 for each arithmetic operation. Here, the arithmetic data type at the time of the arithmetic operations #1 to #4 is a 32-bit floating point. Next, the arithmetic data type decision unit 141 determines whether or not the expressible ratio in the latest iteration for each arithmetic operation exceeds a ratio threshold. For example, in a case where the ratio threshold is set to Tf1, the arithmetic data type decision unit 141 determines whether or not the following formula (3) is satisfied.

[Mathematical Formula 3]

$$Pfi > Tf1 \quad (3)$$

Here, Tf1 that is the ratio threshold of the expressible ratio in the latest iteration can be set to, for example, 80% to 90%.

In a case where the ratio does not exceed the threshold, it is considered that it is difficult to maintain appropriate arithmetic operation accuracy by expression using the 8-bit fixed point in the state at that time. Therefore, the arithmetic data type decision unit 141 determines the arithmetic data type of the arithmetic operation as the 32-bit floating point and notifies the determination of the arithmetic data type request unit 122. For example, in a case where the ratio threshold is set to 80%, an expressible ratio of an arithmetic operation #1 in an iteration of which the iteration ID is it1504 in FIG. 6 is 46.5% and is equal to or less than the ratio threshold. Therefore, the arithmetic data type decision unit 141 determines the arithmetic data type of the arithmetic operation #1 as the 32-bit floating point.

On the other hand, regarding the arithmetic operation of which the expressible ratio exceeds the threshold, the arithmetic data type decision unit 141 determines whether or not a change in the expressible ratio within the determination range is small. For example, the arithmetic data type decision unit 141 calculates Δf which is a fluctuation between iterations in an arithmetic operation f by using the following formula (4). The fluctuation Δf between the iterations in the arithmetic operation f is an example of a "change in a ratio".

[Mathematical Formula 4]

$$\Delta fi = \max_{j \text{ for } i-I \text{ to } i} |Pfj - Pfi| \quad (4)$$

Here, the reference i indicates the number of times of iterations which have been completed at that time. Furthermore, the reference I indicates the determination range. Then, the reference f indicates any integer from i−I to i. Furthermore, the reference Δfi indicates a fluctuation between iterations of the arithmetic operation f in an i-th iteration. Then, the reference Poj indicates an expressible ratio in a j-th iteration within the determination range. Furthermore, the reference Poi indicates an expressible ratio in the i-th iteration. For example, the arithmetic data type decision unit 141 calculates a maximum value of a difference between the expressible ratio at that time and the expressible ratio in the iteration within the determination range as the fluctuation Δfi by using the formula (4).

Next, the arithmetic data type decision unit 141 determines whether or not the calculated fluctuation is less than a predetermined fluctuation threshold. For example, in a case where the fluctuation threshold is set to Tf2, the arithmetic data type decision unit 141 determines whether or not the following formula (5) is satisfied.

[Mathematical Formula 5]

$$\Delta fi < Tf2 \quad (5)$$

In a case where the fluctuation is less than the predetermined fluctuation threshold, it can be said that the decimal point position of the arithmetic operation is likely to converge. Therefore, in a case where the calculated fluctuation is less than the fluctuation threshold, the arithmetic data type decision unit 141 determines the arithmetic data type of the arithmetic operation as the 8-bit fixed point and notifies the determined arithmetic data type of the arithmetic data type request unit 122. On the other hand, in a case where the calculated fluctuation is equal to or more than the fluctuation threshold, the arithmetic data type decision unit 141 determines the arithmetic data type of the arithmetic operation as the 32-bit floating point and notifies the determined arithmetic data type of the arithmetic data type request unit 122.

Here, Tf2 that is a fluctuation threshold can be set to, for example, 10% to 20%. In a case where the fluctuation threshold is 10%, a fluctuation in the use range 73 of the arithmetic operation #3 in FIG. 6 is equal to or more than the fluctuation threshold. On the other hand, the fluctuations in the arithmetic operations #2 and #4 are less than the fluctuation threshold. Therefore, the arithmetic data type decision unit 141 determines the arithmetic data type of the arithmetic operation #3 as the 32-bit floating point and determines the arithmetic data types of the arithmetic operations #2 and #4 as the 8-bit fixed point.

Processing for notifying the 8-bit fixed point as the arithmetic data type and making the arithmetic operation unit 103 perform the arithmetic operation by using the 8-bit fixed point via the execution control unit 102 corresponds to processing for "making an arithmetic operation unit perform an arithmetic operation by using a predetermined-bit fixed point".

Moreover, the arithmetic data type decision unit 141 registers the determined arithmetic data type for each arithmetic operation to the arithmetic data type database 106. As a result, the arithmetic data type decision unit 141 can confirm which arithmetic data type is used in each arithmetic operation in the next iteration by using the arithmetic data type database 106.

The learning data reading unit 105 receives an instruction to read the learning data used for learning from the data reading control unit 124. Then, the learning data reading unit 105 reads the designated learning data from the learning data storage unit 200. Thereafter, the learning data reading unit 105 transmits the read learning data to the data reading control unit 124.

Next, an outline of an entire flow of arithmetic data type determination processing by the information processing apparatus 1 according to the first embodiment will be described with reference to FIG. 7. FIG. 7 is a sequence diagram of the arithmetic data type determination processing by the information processing apparatus according to the first embodiment.

The user application 101 outputs an instruction to perform deep learning to the execution control unit 102 (step S101).

When receiving the instruction to perform deep learning from the user application 101, the execution control unit 102 instructs the arithmetic data type determination unit 104 to initialize the arithmetic data type database 106 (step S102).

The arithmetic data type determination unit 104 receives the instruction to initialize the arithmetic data type database 106 and updates the arithmetic data type of each arithmetic operation of the arithmetic data type database 106 to the 32-bit floating point and initializes the arithmetic data type database 106 (step S103).

Thereafter, the arithmetic data type determination unit 104 notifies the completion of the initialization of the arithmetic data type database 106 of the execution control unit 102 (step S104).

When receiving a response indicating the completion of the initialization of the arithmetic data type database 106, the execution control unit 102 instructs the arithmetic data type determination unit 104 to initialize the expressible ratio database 107 (step S105).

In response to the instruction to initialize the expressible ratio database 107, the arithmetic data type determination unit 104 deletes data registered to the expressible ratio database 107 and initializes the expressible ratio database 107 (step S106).

Thereafter, the arithmetic data type determination unit 104 notifies the completion of the initialization of the expressible ratio database 107 of the execution control unit 102 (step S107).

When receiving the response indicating the completion of the initialization of the expressible ratio database 107, the execution control unit 102 instructs the learning data reading unit 105 to read the learning data to be used for learning (step S108).

In response to the instruction to read the learning data, the learning data reading unit 105 reads the designated learning data from the learning data storage unit 200 (step S109).

Thereafter, the learning data reading unit 105 transmits the read learning data to the execution control unit 102 (step S110).

The execution control unit 102 acquires the learning data from the learning data reading unit 105. Next, the execution control unit 102 outputs a request for acquiring the arithmetic data type to be used in each arithmetic operation in the next iteration to the arithmetic data type determination unit 104 (step S111).

When receiving the request to acquire the arithmetic data type, the arithmetic data type determination unit 104 determines the arithmetic data type to be used in each arithmetic operation by using the arithmetic data type database 106 and the expressible ratio database 107 (step S112).

Then, the arithmetic data type determination unit 104 outputs a notification indicating the determined arithmetic data type used in each arithmetic operation to the execution control unit 102 (step S113).

The execution control unit 102 acquires the arithmetic data type to be used in each arithmetic operation. Then, the execution control unit 102 outputs the acquired learning data to the arithmetic operation unit 103 and notifies the arithmetic data type to be used in each arithmetic operation of the arithmetic operation unit 103 and makes the arithmetic operation unit 103 perform the arithmetic operation (step S114).

Thereafter, the execution control unit 102 receives an input of the arithmetic operation result from the arithmetic operation unit 103 (step S115).

Next, the execution control unit 102 outputs the acquired arithmetic operation result to the arithmetic data type determination unit 104 and instructs to update the expressible ratio database 107 (step S116).

The arithmetic data type determination unit 104 calculates an expressible ratio by using the tensor element number included in the arithmetic operation result, registers the calculated expressible ratio, and updates the expressible ratio database 107 (step S117).

Thereafter, the arithmetic data type determination unit 104 outputs a notification indicating update completion of the expressible ratio database 107 to the execution control unit 102 (step S118).

Next, the execution control unit 102 instructs the arithmetic data type determination unit 104 to update the arithmetic data type database 106 (step S119).

The arithmetic data type determination unit 104 registers the arithmetic data type used in each arithmetic operation in the latest iteration and updates the arithmetic data type database 106 (step S120).

Thereafter, the arithmetic data type determination unit 104 outputs a notification indicating the update completion of the arithmetic data type database 106 to the execution control unit 102 (step S121).

The execution control unit 102 receives the input of the notification indicating the update completion of the arithmetic data type database 106 from the execution control unit 102. The execution control unit 102, the arithmetic operation unit 103, the arithmetic data type determination unit 104, and the learning data reading unit 105 repeat steps S111 to S121 until all the arithmetic operations included in one iteration are completed. Moreover, the execution control unit 102, the arithmetic operation unit 103, the arithmetic data type determination unit 104, and the learning data reading unit 105 repeat steps S108 to S121 until deep learning is completed. Thereafter, the execution control unit 102 notifies the completion of deep learning of the user application 101 (step S122).

Figure 8A:
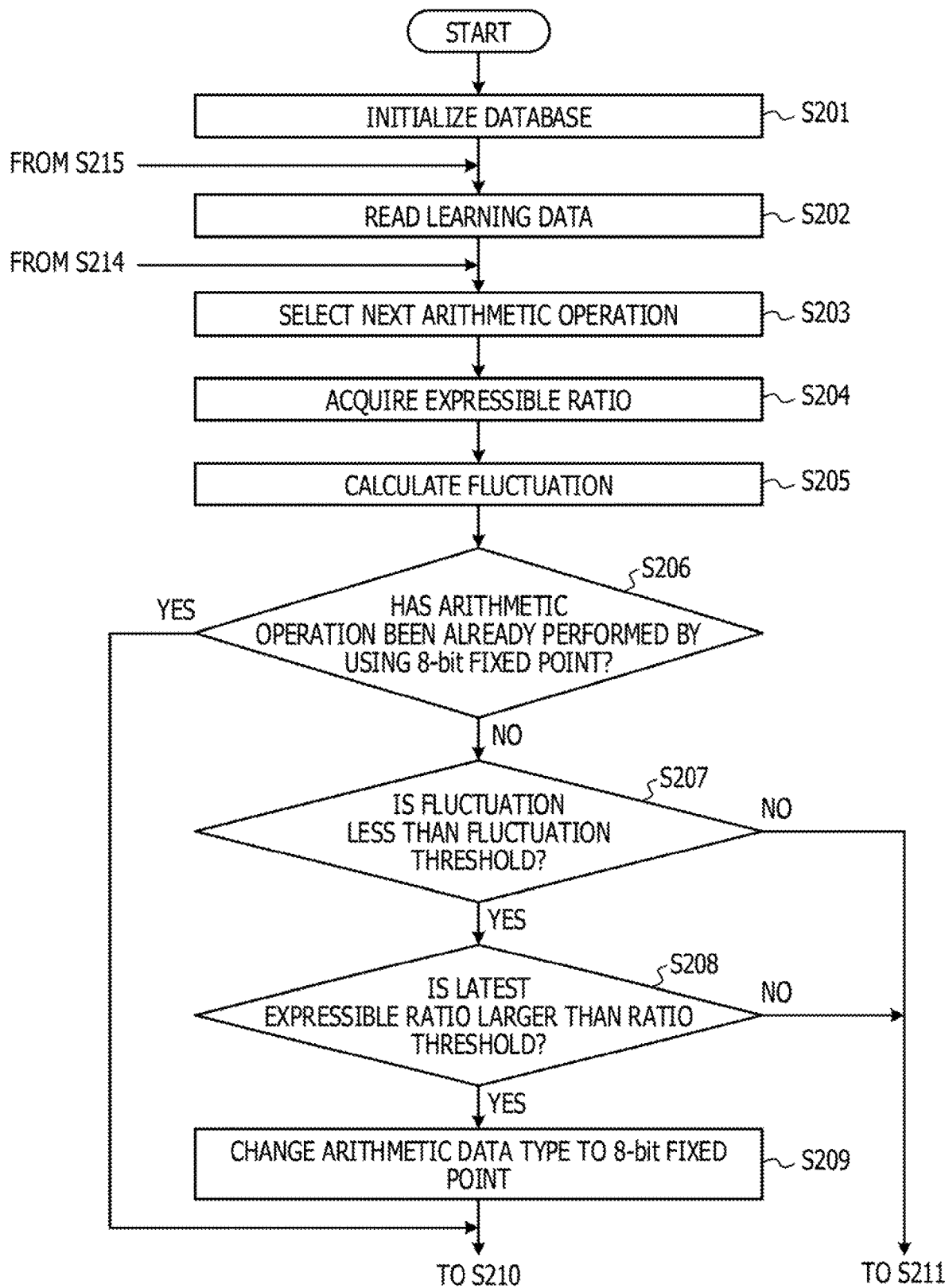
FIGS. 8A and 8B are a flowchart of the arithmetic data type determination processing according to the first embodiment.
Figure 8B:
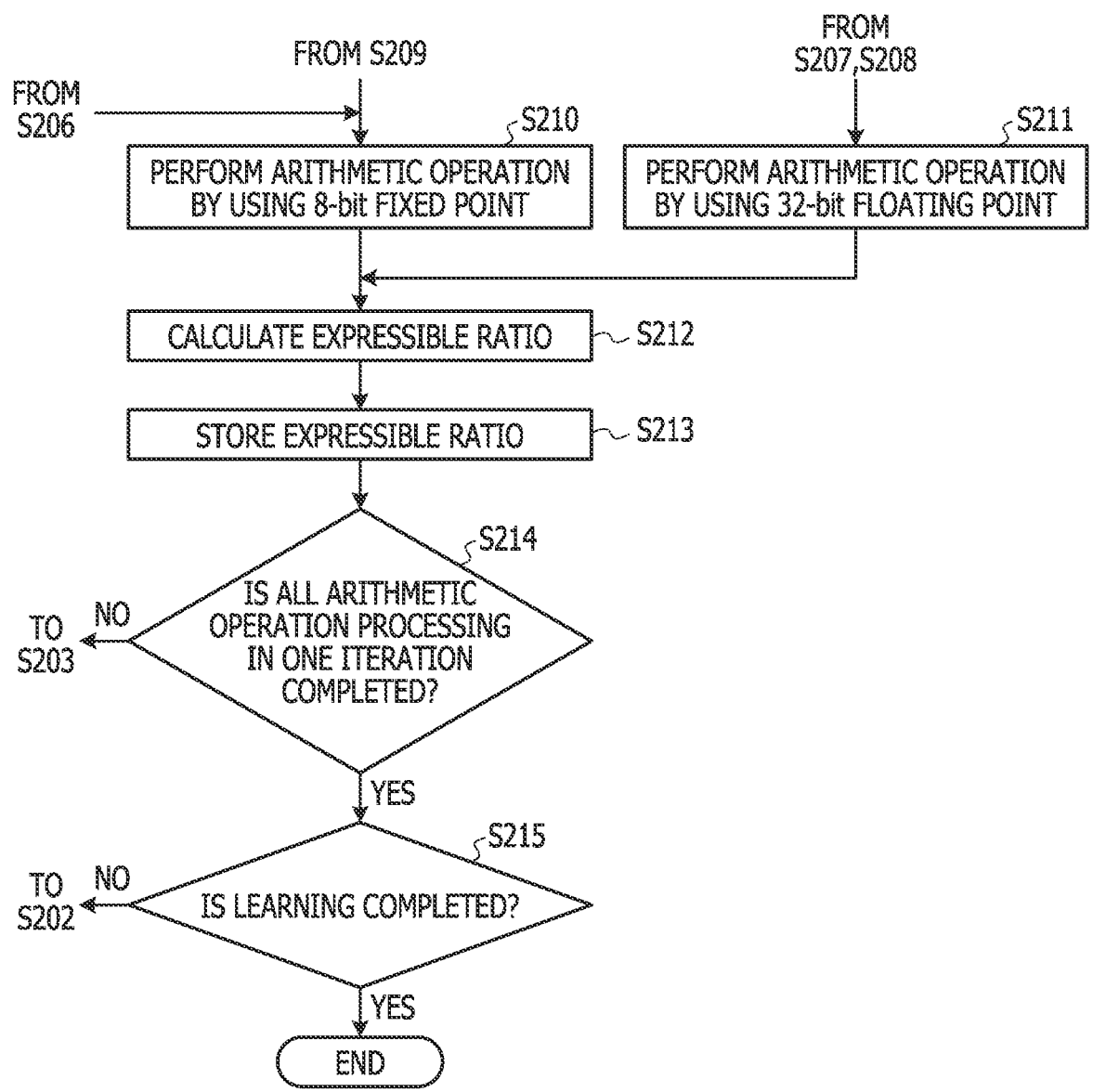

Next, a detailed flow of the arithmetic data type determination processing according to the first embodiment will be described with reference to FIGS. 8A and 8B. FIGS. 8A and 8B are a flowchart of the arithmetic data type determination processing according to the first embodiment.

Upon receiving the instruction to perform deep learning from the user application 101, the database update instruction unit 123 outputs an instruction to initialize the arithmetic data type database 106 to the arithmetic data type decision unit 141. Furthermore, the database update instruction unit 123 outputs an instruction to initialize the expressible ratio database 107 to the database update unit 142. The arithmetic data type decision unit 141 changes the arithmetic data type of each arithmetic operation registered to the arithmetic data type database 106 to the 32-bit floating point and initializes the arithmetic data type database 106. Furthermore, the database update unit 142 deletes the expressible ratio registered to the expressible ratio database 107 and initializes the expressible ratio database 107. With this operation, the arithmetic data type determination unit 104 initializes the database (step S201).

The data reading control unit 124 receives a notification indicating the initialization completion of the database from the database update instruction unit 123. Furthermore, the data reading control unit 124 receives a request for acquiring the learning data from the arithmetic operation instruction unit 121. Then, the data reading control unit 124 outputs a request for reading the learning data to the learning data reading unit 105. In response to the request for reading the learning data, the learning data reading unit 105 reads learning data designated from the learning data storage unit 200 (step S202). Thereafter, the learning data reading unit 105 outputs the read learning data to the data reading control unit 124. The data reading control unit 124 outputs the acquired learning data to the arithmetic operation instruction unit 121.

The arithmetic operation instruction unit 121 selects a next arithmetic operation in an iteration from the instruction to perform deep learning input from the user application 101 (step S203).

Then, the arithmetic operation instruction unit 121 outputs a request for acquiring an arithmetic data type used in the selected arithmetic operation to the arithmetic data type decision unit 141. Upon receiving the acquisition request, the arithmetic data type decision unit 141 acquires an expressible ratio in an iteration within a use range of the selected arithmetic operation from the expressible ratio database 107 (step S204). However, in a case where the iteration is not proceeded and iterations within the use range are not obtained, the arithmetic data type decision unit 141 determines that an error occurs in the acquisition of the expressible ratio.

Next, the arithmetic data type decision unit 141 calculates a fluctuation in the expressible ratio by using the acquired expressible ratio in the formula (4) (step S205). However, in a case where an error occurs in the acquisition of the expressible ratio, the arithmetic data type decision unit 141 does not calculate the fluctuation in the expressible ratio and remains the fluctuation to be uncalculated.

Next, the arithmetic data type decision unit 141 determines whether or not the selected arithmetic operation has been already performed using the 8-bit fixed point (step S206). In a case where the arithmetic operation has been already performed using the 8-bit fixed point (step S206: yes), the arithmetic data type decision unit 141 maintains the arithmetic data type used in the selected arithmetic operation as the 8-bit fixed point, and the procedure proceeds to step S210.

On the other hand, in a case where the arithmetic operation has not been performed yet by using the 8-bit fixed point (step S206: no), the arithmetic data type decision unit 141 determines whether or not the fluctuation in the expressible ratio is less than the fluctuation threshold (step S207).

In a case where the fluctuation in the expressible ratio is less than the fluctuation threshold (step S207: yes), the arithmetic data type decision unit 141 determines whether or not the latest expressible ratio is larger than the ratio threshold (step S208).

In a case where the latest expressible ratio is larger than the ratio threshold (step S208: yes), the arithmetic data type decision unit 141 determines the arithmetic data type as the 8-bit fixed point. Thereafter, the arithmetic data type decision unit 141 notifies of the arithmetic operation instruction unit 121 that the 8-bit fixed point is used as the arithmetic data type of the selected arithmetic operation and changes the arithmetic data type to the 8-bit fixed point. (step S209).

The arithmetic operation instruction unit 121 makes the arithmetic operation unit 103 perform the selected arithmetic operation by using the 8-bit fixed point (step S210).

On the other hand, in a case where the fluctuation is not less than the fluctuation threshold (step S207: no) or in a case where the latest expressible ratio is equal to or less than the ratio threshold (step S208: no), the arithmetic data type decision unit 141 maintains the arithmetic data type of the selected arithmetic operation as the 32-bit floating point. Here, in a case where the fluctuation in the expressible ratio is not calculated, the arithmetic data type decision unit 141 determines that the fluctuation is not less than the fluctuation threshold. In this case, in the present embodiment, the arithmetic data type decision unit 141 does not notify the instruction to change the arithmetic data type of the arithmetic operation instruction unit 121. However, the arithmetic data type decision unit 141 may notify of the arithmetic operation instruction unit 121 that the 32-bit floating point is used as the arithmetic data type of the selected arithmetic operation. The arithmetic operation instruction unit 121 makes the arithmetic operation unit 103 perform the selected arithmetic operation by using the 32-bit floating point (step S211).

Thereafter, the arithmetic data type request unit 122 acquires the arithmetic operation result of the selected arithmetic operation from the arithmetic operation unit 103. Then, the arithmetic data type request unit 122 outputs the acquired arithmetic operation result to the database update unit 142 and instructs to update the expressible ratio database 107. The database update unit 142 calculates the expressible ratio by using the tensor element number included in the input arithmetic operation result (step S212).

Next, the database update unit 142 stores the calculated expressible ratio in the expressible ratio database 107 (step S213).

The arithmetic operation instruction unit 121 determines whether or not all the arithmetic operation processing in one iteration is completed according to whether or not the iteration completion notification is acquired from the arithmetic operation unit 103 (step S214). In a case where there is arithmetic operation processing that is not executed yet (step S214: no), the arithmetic operation instruction unit 121 returns to step S203.

On the other hand, in a case where all the arithmetic operation processing in one iteration has been completed (step S214: yes), the arithmetic operation instruction unit 121 determines whether or not deep learning is completed (step S215). In a case where deep learning is not completed (step S215: no), the arithmetic operation instruction unit 121 returns to step S202.

On the other hand, in a case where deep learning is completed (step S215: yes), the arithmetic operation instruction unit 121 notifies the completion of deep learning of the user application 101. Then, the arithmetic operation instruction unit 121 terminates deep learning including switching of the arithmetic data types.

As described above, the information processing apparatus according to the present embodiment obtains the expressible ratio of the number of elements included in the arithmetic operation result with the 8-bit fixed point, and if the obtained expressible ratio is equal to or more than the threshold and the fluctuation is less than the threshold, the information processing apparatus switches the arithmetic data type to the 8-bit fixed point. In this way, since the arithmetic data type is automatically switched at the timing when expression by the 8-bit fixed point can be sufficiently made, it is not necessary for an operator to designate a timing of the arithmetic data type by trial and error, and it is possible to easily improve the learning efficiency of deep learning and machine learning. Furthermore, since the arithmetic data type is switched based on the expressible element number, stagnation in learning due to insufficient arithmetic operation accuracy caused by insufficient previous learning can be reduced.

Moreover, since the arithmetic data type is automatically changed during the learning arithmetic operation, for example, in a case where additional learning or transfer learning is performed by using a model of deep learning constructed by other systems, it is not necessary for the operator to designate the arithmetic data type for each arithmetic operation defined by the model. For example, operability can be improved even in such a case.

Furthermore, in the present embodiment, the arithmetic data type is automatically switched from the 32-bit floating point to the 8-bit fixed point. However, in the fields of machine learning and deep learning, it is considered that there are a certain number of operators who emphasizes the recognition accuracy after learning than arithmetic operation performance. Therefore, it is also important to consider the operator who emphasizes the recognition accuracy after learning.

Therefore, the information processing apparatus according to the present embodiment may be configured to be able to select automatic switching to the 8-bit fixed point or execution of all the arithmetic operations with the 32-bit floating point. In a case where the automatic switching to the 8-bit fixed point is selected, the information processing apparatus executes processing similar to the above processing. On the other hand, in a case where the execution of all the arithmetic operations with the 32-bit floating point is selected, the information processing apparatus performs all the arithmetic operations with the 32-bit floating point without switching the arithmetic data type to the 8-bit fixed point until deep learning is completed.

Modification

In the first embodiment, a case where the single information processing apparatus 1 performs learning has been described as an example. However, a similar function can be applied to a case where a plurality of information processing apparatuses is used for learning, and a similar effect can be obtained.

Figure 9:
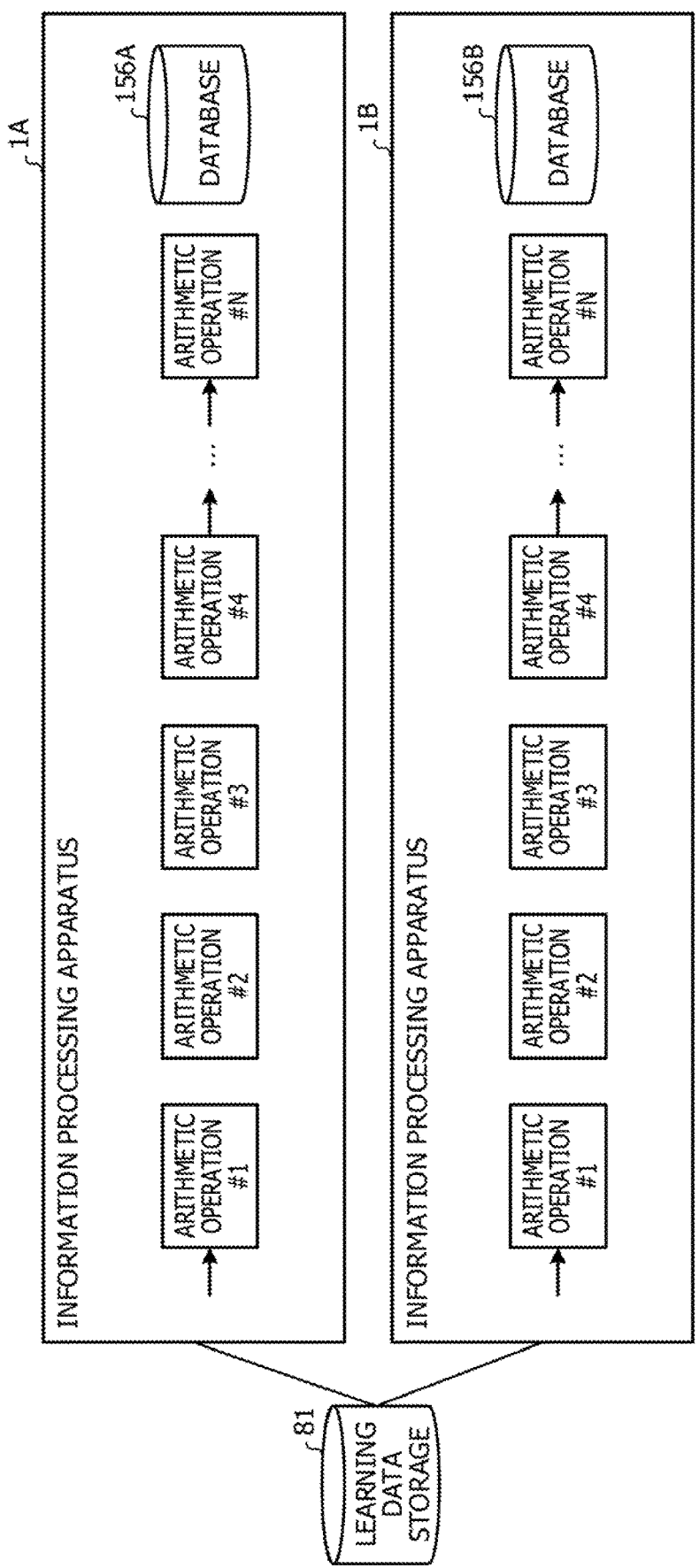
FIG. 9 is a diagram illustrating learning by using two information processing apparatuses.

For example, FIG. 9 is a diagram illustrating learning by using two information processing apparatuses. Here, learning data stored in a learning data storage 81 is used by both of information processing apparatuses 1A and 1B.

The information processing apparatus 1A acquires the learning data stored in the learning data storage 81 and proceeds learning. In this case, a database 156A corresponds to the arithmetic data type database 106 and the expressible ratio database 107 in FIG. 3. The information processing apparatus 1A calculates an expressible ratio for each iteration from a tensor element number of an arithmetic operation result and stores the expressible ratio in the database 156A. Then, the information processing apparatus 1A determines an arithmetic data type from the expressible ratio stored in the database 156A and automatically switches the arithmetic data type used in the arithmetic operations #1 to #n to the 8-bit fixed point.

Similarly, the information processing apparatus 1B acquires the learning data from the learning data storage 81 and proceeds learning. In this case, a database 156B corresponds to the arithmetic data type database 106 and the expressible ratio database 107 in FIG. 3. The information processing apparatus 1B calculates an expressible ratio for each iteration from a tensor element number of an arithmetic operation result and stores the expressible ratio in the database 156B. Then, the information processing apparatus 1B determines an arithmetic data type from the expressible ratio stored in the database 156B and automatically switches the arithmetic data type used in the arithmetic operations #1 to #n to the 8-bit fixed point.

Thereafter, learning results of the information processing apparatuses 1A and 1B are collected, and learning is completed. In this way, even in a case where the plurality of information processing apparatuses is used for learning, each information processing apparatus can easily improve a learning efficiency of machine learning.

Second Embodiment

Next, a second embodiment will be described. An information processing apparatus 1 according to the present embodiment is different from the first embodiment in that a part of arithmetic operations that is difficult to be expressed by the 8-bit fixed point and can be expressed by a 16-bit fixed point is performed by using the 16-bit fixed point. A block diagram of the information processing apparatus 1 according to the present embodiment is illustrated in FIG. 3. In the following description, arithmetic data type determination processing will be mainly described. Description of a function of each unit similar to that in the first embodiment will be omitted.

An expressible ratio database 107 according to the present embodiment has a format illustrated in FIG. 10. FIG. 10 is a diagram of an example of registration information in an expressible ratio database according to the second embodiment. As illustrated in FIG. 10, in the expressible ratio database 107 according to the present embodiment, an expressible ratio by an 8-bit fixed point and an expressible ratio by a 16-bit fixed point of a tensor element number included in an arithmetic operation result are registered for each arithmetic operation of each iteration.

Furthermore, an arithmetic data type database 106 according to the present embodiment has a format illustrated in FIG. 11. FIG. 11 is a diagram of an example of registration information in an arithmetic data type database according to the second embodiment. As illustrated in FIG. 11, in the arithmetic data type database 106 according to the present embodiment, either one of a 32-bit floating point, a 16-bit fixed point, or an 8-bit fixed point is registered as an arithmetic data type used in each arithmetic operation in association with each arithmetic ID.

A database update unit 142 receives an input of the arithmetic operation result of an arithmetic operation performed in the latest iteration from the database update instruction unit 123. Next, the database update unit 142 acquires a tensor element number from the arithmetic operation result. Next, the database update unit 142 determines an appropriate decimal point position $Q_8$ in an arithmetic operation in a case where the arithmetic operation result is expressed by the 8-bit fixed point by using the acquired tensor element number and the formula (1). Then, an expressible ratio $P_8$ of the tensor element number by the 8-bit fixed point in a case of the decimal point position $Q_8$ is calculated by using the formula (2). Then, the database update unit 142 registers the expressible ratio by the 8-bit fixed point in each arithmetic operation in the latest iteration to the expressible ratio database 107.

Next, the database update unit 142 determines an appropriate decimal point position $Q_{16}$ in an arithmetic operation in a case where the arithmetic operation result is expressed by the 16-bit fixed point by using the acquired tensor element number and the next formula (6).

[Mathematical Formula 6]

$$Q_{16}=16-\text{ceil}(\log_2 \max(|x \min|, x \max))-1 \qquad (6)$$

Next, the database update unit 142 calculates an expressible ratio $P_{16}$ of the tensor element number by the 16-bit fixed point in a case of the decimal point position $Q_{16}$ by using the next formula (7). Then, the database update unit 142 registers the expressible ratio by the 16-bit fixed point in each arithmetic operation in the latest iteration to the expressible ratio database 107.

[Mathematical Formula 7]

$$P_{16} = \frac{\text{The number of tensor elements of which value is within range } R_{16}}{N} \qquad (7)$$

As a result, the database update unit 142 registers the data illustrated in FIG. 10 to the expressible ratio database 107. For example, in the expressible ratio database 107, the expressible ratio in a case where the 8-bit floating point is used and the expressible ratio in a case where the 16-bit floating point is used are registered.

Here, the 8-bit fixed point corresponds to an example of a "first predetermined-bit fixed point", and the 16-bit fixed point corresponds to an example of a "second predetermined-bit fixed point". In the following description, the expressible ratio in a case where the 8-bit floating point is used is referred to as an "8-bit expressible ratio", and the expressible ratio in a case where the 16-bit floating point is used is referred to as a "16-bit expressible ratio".

An arithmetic data type decision unit 141 receives an input of a request for acquiring an arithmetic data type used in each arithmetic operation from an arithmetic data type request unit 122. Next, the arithmetic data type decision unit 141 confirms the arithmetic data type database 106 and acquires a current arithmetic data type of each arithmetic operation. Then, the arithmetic data type decision unit 141 specifies an arithmetic operation in which the 8-bit fixed point has been already set as the arithmetic data type. The arithmetic data type decision unit 141 notifies an 8-bit fixed point of the specified arithmetic operation, in which the 8-bit fixed point has been already set as the arithmetic data type, of the arithmetic data type request unit 122 as the arithmetic data type.

On the other hand, regarding the arithmetic operation in which arithmetic data types other than the 8-bit fixed point are set as the arithmetic data type, the arithmetic data type decision unit 141 acquires an 8-bit expressible ratio in an iteration within a determination range from the latest iteration from the expressible ratio database 107.

For example, with reference to FIG. 12, a case will be described where the 1504 times of iterations have been terminated at that time. FIG. 12 is a diagram for explaining arithmetic data type determination processing according to the second embodiment. A table 171 in FIG. 12 is a table in which the expressible ratio database 107 is rearranged for easy understanding.

For example, in a case where the determination range is four times of iterations, the arithmetic data type decision unit 141 acquires 8-bit expressible ratios in use ranges 711, 713, and 715 in FIG. 12 for each arithmetic operation. Here, the arithmetic data type at the time of the arithmetic operations #1 to #3 is a 32-bit floating point. Next, the arithmetic data type decision unit 141 determines whether or not the 8-bit expressible ratio in the latest iteration for each arithmetic operation exceeds a ratio threshold. For example, in a case where the ratio threshold is set to Tf1, the arithmetic data type decision unit 141 determines whether or not the formula (3) is satisfied.

Regarding the arithmetic operation of which the expressible ratio exceeds the threshold, the arithmetic data type decision unit 141 determines whether or not a change in the 8-bit expressible ratio within the determination range is small. For example, the arithmetic data type decision unit 141 calculates a fluctuation Δf between the iterations for an arithmetic operation f by using the formula (4).

Next, the arithmetic data type decision unit 141 determines whether or not the calculated fluctuation in the 8-bit expressible ratio is less than a fluctuation threshold. For example, in a case where the fluctuation threshold is set to Tf2, the arithmetic data type decision unit 141 determines whether or not the formula (5) is satisfied.

For the arithmetic operation of which the fluctuation in the 8-bit expressible ratio is less than the fluctuation threshold, an arithmetic data type of the arithmetic operation is determined as the 8-bit fixed point, and the arithmetic data type is notified to the arithmetic data type request unit 122.

Regarding the arithmetic operation of which the 8-bit expressible ratio is equal to or less than the ratio threshold and the fluctuation in the 8-bit expressible ratio is equal to or more than a predetermined fluctuation threshold, the arithmetic data type decision unit 141 specifies an arithmetic operation of which the arithmetic data type has been already set as the 16-bit fixed point. The arithmetic data type decision unit 141 notifies a 16-bit fixed point of the specified arithmetic operation, in which the 16-bit fixed point has been already set as the arithmetic data type, of the arithmetic data type request unit 122 as the arithmetic data type.

On the other hand, regarding the arithmetic operation in which arithmetic data types other than the 16-bit fixed point are set as the arithmetic data type, the arithmetic data type decision unit 141 acquires a 16-bit expressible ratio of an iteration within a determination range from the latest iteration from the expressible ratio database 107. In this case, the arithmetic operation using the arithmetic data types other than the 16-bit fixed point as the arithmetic data type is an arithmetic operation using the 32-bit floating point as the arithmetic data type.

For example, the arithmetic data type decision unit 141 acquires 16-bit expressible ratios in use ranges 712, 714, and 716 in FIG. 12 for each arithmetic operation. Next, the arithmetic data type decision unit 141 determines whether or not the 16-bit expressible ratio in the latest iteration for each arithmetic operation exceeds a ratio threshold. For example, in a case where the ratio threshold is set to Tf1, the arithmetic data type decision unit 141 determines whether or not the formula (3) is satisfied.

Regarding the arithmetic operation of which the expressible ratio exceeds a threshold, the arithmetic data type decision unit 141 determines whether or not a change in the 16-bit expressible ratio within the determination range is small. For example, the arithmetic data type decision unit 141 calculates a fluctuation Δf between the iterations for an arithmetic operation f by using the formula (4).

Next, the arithmetic data type decision unit 141 determines whether or not the calculated fluctuation in the 16-bit expressible ratio is less than a fluctuation threshold. For example, in a case where the fluctuation threshold is set to Tf2, the arithmetic data type decision unit 141 determines whether or not the formula (5) is satisfied. For the arithmetic operation of which the fluctuation in the 16-bit expressible ratio is less than the fluctuation threshold, an arithmetic data type of the arithmetic operation is determined as the 16-bit fixed point, and the arithmetic data type is notified to the arithmetic data type request unit 122.

On the other hand, regarding the arithmetic operation of which the 16-bit expressible ratio is equal to or less than the ratio threshold and the arithmetic operation of which the fluctuation in the 16-bit expressible ratio is equal to or more than the predetermined fluctuation threshold, the arithmetic data type decision unit 141 determines the arithmetic data type of the arithmetic operation as the 32-bit floating point. Then, the arithmetic data type decision unit 141 notifies, of the arithmetic data type request unit 122, that the 32-bit floating point is used as the arithmetic data type of the arithmetic operation.

Here, in the present embodiment, the arithmetic data type decision unit 141 confirms the changes in the 8-bit expressible ratio and the 16-bit expressible ratio regarding the arithmetic operations in which the 8-bit fixed point and the 16-bit fixed point are set as the arithmetic data type. This processing is possible for the following reason. At the time of arithmetic operation, even in a case where the arithmetic operation is performed by using the 8-bit fixed point and the 16-bit fixed point, the arithmetic operation unit 103 performs the arithmetic operation by using intermediate data having larger arithmetic operation accuracy in the arithmetic operation and makes an output with accuracy of 8-bit fixed point or the 16-bit fixed point. Then, the database update unit 142 calculates the 8-bit expressible ratio and the 16-bit expressible ratio by using the intermediate data that is the arithmetic operation result before the accuracy is changed to the accuracy of the 8-bit fixed point and the 16-bit fixed point. Therefore, the arithmetic data type decision unit 141 can determine the changes in the 8-bit expressible ratio and the 16-bit expressible ratio regarding the arithmetic operation results of the arithmetic operations using the 8-bit fixed point and the 16-bit fixed point.

For example, arithmetic data type determination processing by the arithmetic data type decision unit 141 in a case where the ratio threshold is set to 80% and the fluctuation threshold is set to 10% in FIG. 12 will be described. The arithmetic data type decision unit 141 determines that an 8-bit expressible ratio of an arithmetic operation #1 in an iteration having an iteration ID of it1504 is 46.5% and is equal to or less than the ratio threshold and a 16-bit expressible ratio is 99.2% and is larger than the ratio threshold. Therefore, the arithmetic data type decision unit 141 determines not to use the 8-bit fixed point as the arithmetic data type of the arithmetic operation #1. Moreover, the arithmetic data type decision unit 141 obtains a fluctuation in the 16-bit expressible ratio in the use range 712 and determines that the obtained value is less than the fluctuation threshold. Therefore, the arithmetic data type decision unit 141 determines the arithmetic data type of the arithmetic operation #1 as the 16-bit fixed point.

Furthermore, the arithmetic data type decision unit 141 determines that the 8-bit expressible ratio of the arithmetic operation #2 in the iteration having the iteration ID of it1504 is 97.2% and is larger than the ratio threshold. Next, the arithmetic data type decision unit 141 obtains a fluctuation in the 8-bit expressible ratio in the use range 713 and determines that the obtained value is less than the fluctuation threshold. With this determination, the arithmetic data type decision unit 141 determines the arithmetic data type of the arithmetic operation #2 as the 8-bit fixed point.

Furthermore, the arithmetic data type decision unit 141 determines that an 8-bit expressible ratio of an arithmetic operation #3 in the iteration having the iteration ID of it1504 is 96.9% and is larger than the ratio threshold and a 16-bit expressible ratio is 99.2% and is larger than the ratio threshold. Therefore, the arithmetic data type decision unit 141 obtains the fluctuation of the 8-bit expressible ratio of the use range 715 and determines that the obtained value is equal to or more than the fluctuation threshold. Next, the arithmetic data type decision unit 141 obtains a fluctuation in the 16-bit expressible ratio in the use range 716 and determines that the fluctuation is equal to or more than the fluctuation threshold. In this case, the arithmetic data type decision unit 141 determines not to use the 8-bit fixed point and the 16-bit fixed point as the arithmetic data type of the arithmetic operation #3. Therefore, the arithmetic data type decision unit 141 determines the arithmetic data type of the arithmetic operation #3 as the 32-bit floating point.

Figure 13A:
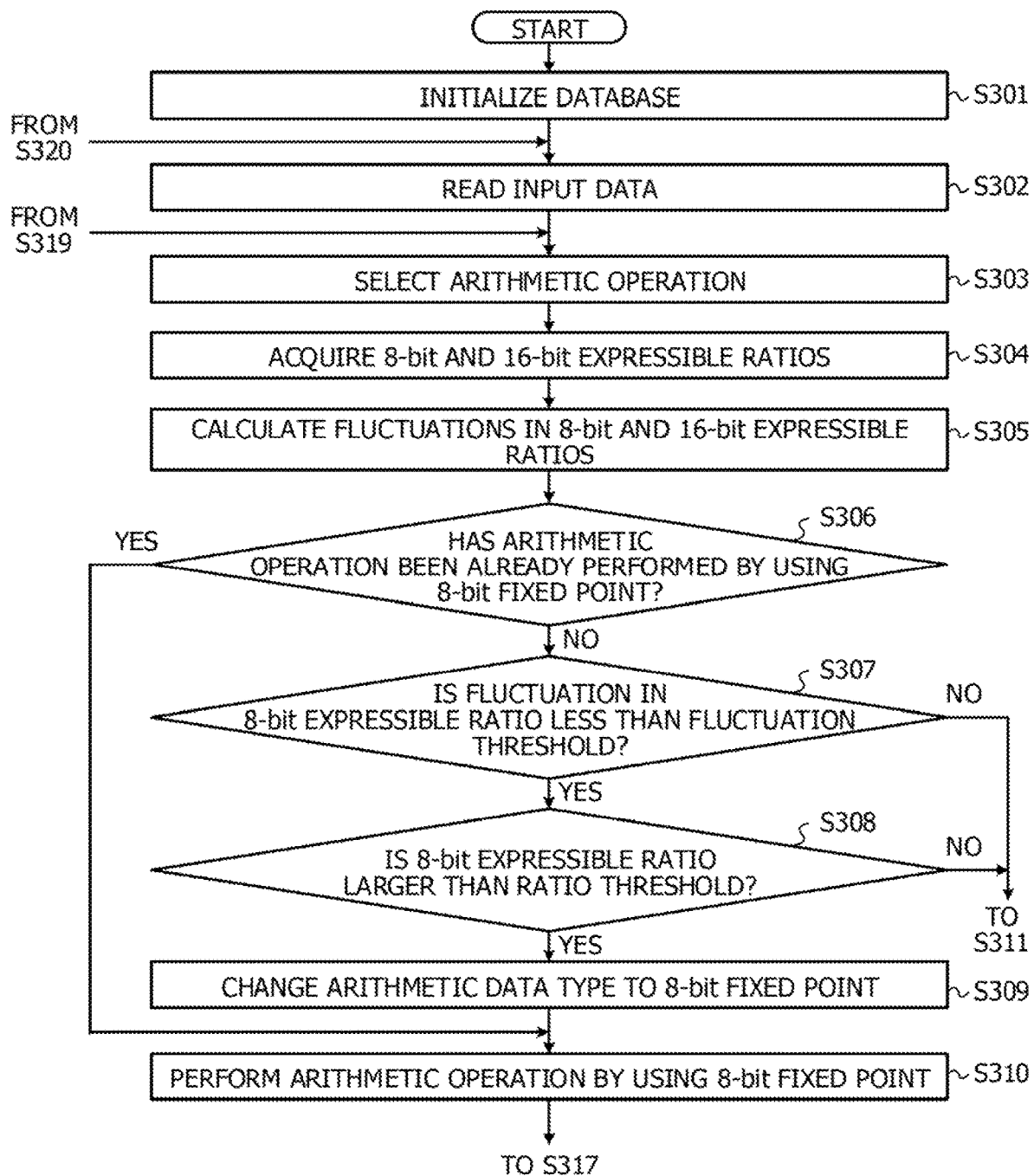
FIGS. 13A and 13B are a flowchart of the arithmetic data type determination processing according to the second embodiment.
Figure 13B:
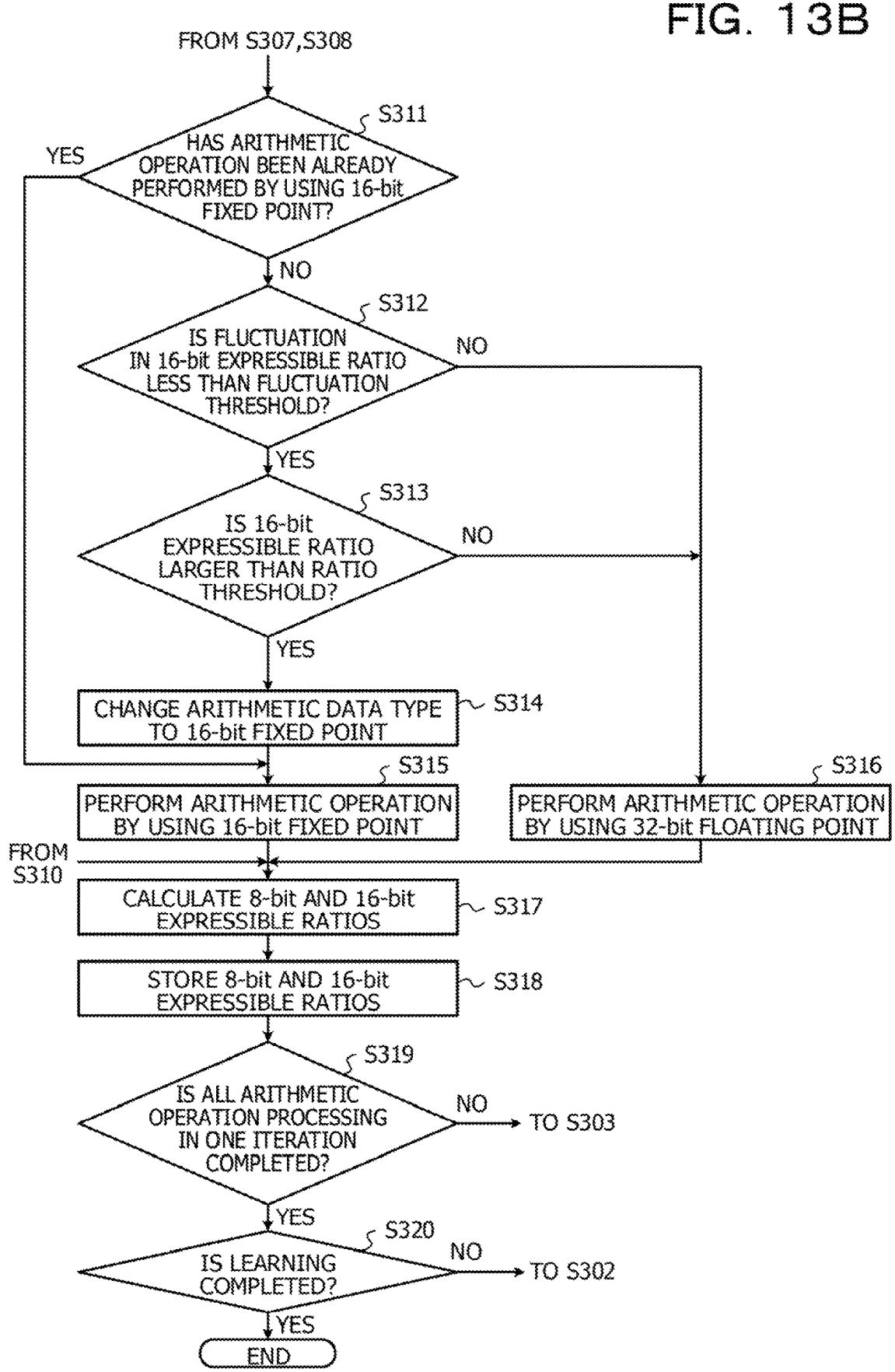

Next, a detailed flow of the arithmetic data type determination processing according to the second embodiment will be described with reference to FIGS. 13A and 13B. FIGS. 13A and 13B are a flowchart of the arithmetic data type determination processing according to the second embodiment.

An arithmetic data type determination unit 104 initializes the arithmetic data type database 106 and the expressible ratio database 107 (step S301).

The data reading control unit 124 receives a notification indicating the initialization completion of the database from the database update instruction unit 123. Furthermore, the data reading control unit 124 receives a request for acquiring the learning data from the arithmetic operation instruction unit 121. Then, the data reading control unit 124 outputs a request for reading the learning data to the learning data reading unit 105. In response to the request for reading the learning data, a learning data reading unit 105 reads designated learning data from a learning data storage unit 200 (step S302). Thereafter, the learning data reading unit 105 outputs the read learning data to the data reading control unit 124. The data reading control unit 124 outputs the acquired learning data to the arithmetic operation instruction unit 121.

An arithmetic operation instruction unit 121 selects a next arithmetic operation in an iteration from the instruction to perform deep learning input from a user application 101 (step S303).

Then, the arithmetic operation instruction unit 121 outputs a request for acquiring an arithmetic data type used in the selected arithmetic operation to the arithmetic data type decision unit 141. Upon receiving the acquisition request, the arithmetic data type decision unit 141 acquires an 8-bit expressible ratio and a 16-bit expressible ratio in an iteration within a use range of the selected arithmetic operation from the expressible ratio database 107 (step S304). However, in a case where the iteration is not proceeded and iterations within the use range are not obtained, the arithmetic data type decision unit 141 determines that an error occurs in the acquisition of the expressible ratio.

Next, the arithmetic data type decision unit 141 calculates fluctuations in the 8-bit expressible ratio and the 16-bit expressible ratio by using the acquired 8-bit expressible ratio and 16-bit expressible ratio in the formula (4) (step S305). However, in a case where an error occurs in the acquisition of the expressible ratio, the arithmetic data type decision unit 141 does not calculate the fluctuation in the expressible ratio and remains the fluctuation to be uncalculated.

Next, the arithmetic data type decision unit 141 determines whether or not the selected arithmetic operation has been already performed using the 8-bit fixed point (step S306). In a case where the arithmetic operation has been already performed using the 8-bit fixed point (step S306: yes), the arithmetic data type decision unit 141 maintains the arithmetic data type used in the selected arithmetic operation as the 8-bit fixed point, and the procedure proceeds to step S310.

On the other hand, in a case where the arithmetic operation has not been performed yet by using the 8-bit fixed point (step S306: no), the arithmetic data type decision unit 141 determines whether or not the fluctuation in the 8-bit expressible ratio is less than the fluctuation threshold (step S307).

In a case where the fluctuation in the 8-bit expressible ratio is less than the fluctuation threshold (step S307: yes), the arithmetic data type decision unit 141 determines whether or not the latest 8-bit expressible ratio is larger than the ratio threshold (step S308).

In a case where the latest 8-bit expressible ratio is larger than the ratio threshold (step S308: yes), the arithmetic data type decision unit 141 determines the arithmetic data type as the 8-bit fixed point. Thereafter, the arithmetic data type decision unit 141 notifies of the arithmetic operation instruction unit 121 that the 8-bit fixed point is used as the arithmetic data type of the selected arithmetic operation and changes the arithmetic data type to the 8-bit fixed point. (step S309).

The arithmetic operation instruction unit 121 makes the arithmetic operation unit 103 perform the selected arithmetic operation by using the 8-bit fixed point (step S310).

On the other hand, in a case where the fluctuation in the 8-bit expressible ratio is not less than the fluctuation threshold (step S307: no) or in a case where the latest 8-bit expressible ratio is equal to or less than the ratio threshold (step S308: no), the arithmetic data type decision unit 141 executes the following processing. Here, in a case where the fluctuation in the 8-bit expressible ratio is not calculated, the arithmetic data type decision unit 141 determines that the fluctuation is not less than the fluctuation threshold. The arithmetic data type decision unit 141 determines whether or not the selected arithmetic operation has been already performed using the 16-bit fixed point (step S311). In a case where the arithmetic operation has been already performed using the 16-bit fixed point (step S311: yes), the arithmetic data type decision unit 141 maintains the arithmetic data type used in the selected arithmetic operation as the 16-bit fixed point, and the procedure proceeds to step S315.

On the other hand, in a case where the arithmetic operation has not been performed yet by using the 16-bit fixed point (step S311: no), the arithmetic data type decision unit 141 determines whether or not the fluctuation in the 16-bit expressible ratio is less than the fluctuation threshold (step S312).

In a case where the fluctuation in the 16-bit expressible ratio is less than the fluctuation threshold (step S312: yes), the arithmetic data type decision unit 141 determines whether or not the latest 16-bit expressible ratio is larger than the ratio threshold (step S313).

In a case where the latest 16-bit expressible ratio is larger than the ratio threshold (step S313: yes), the arithmetic data type decision unit 141 determines the arithmetic data type as the 16-bit fixed point. Thereafter, the arithmetic data type decision unit 141 notifies of the arithmetic operation instruction unit 121 that the 16-bit fixed point is used as the arithmetic data type of the selected arithmetic operation and changes the arithmetic data type to the 16-bit fixed point (step S314).

The arithmetic operation instruction unit 121 makes the arithmetic operation unit 103 perform the selected arithmetic operation by using the 16-bit fixed point (step S315).

On the other hand, in a case where the fluctuation in the 16-bit expressible ratio is not less than the fluctuation threshold (step S312: no) or in a case where the latest 16-bit expressible ratio is equal to or less than the ratio threshold (step S313: no), the arithmetic data type decision unit 141 executes the following processing. Here, in a case where the fluctuation in the 16-bit expressible ratio is not calculated, the arithmetic data type decision unit 141 determines that the fluctuation is not less than the fluctuation threshold. The arithmetic data type decision unit 141 determines to maintain the arithmetic data type of the selected arithmetic operation as the 32-bit floating point. In this case, in the present embodiment, the arithmetic data type decision unit 141 does not notify the instruction to change the arithmetic data type of the arithmetic operation instruction unit 121. However, the arithmetic data type decision unit 141 may notify of the arithmetic operation instruction unit 121 that the 32-bit floating point is used as the arithmetic data type of the selected arithmetic operation. The arithmetic operation instruction unit 121 makes the arithmetic operation unit 103 perform the selected arithmetic operation by using the 32-bit floating point (step S316).

Thereafter, the arithmetic data type request unit 122 acquires the arithmetic operation result of the selected arithmetic operation from the arithmetic operation unit 103. Then, the arithmetic data type request unit 122 outputs the acquired arithmetic operation result to the database update unit 142 and instructs to update the expressible ratio database 107. The database update unit 142 calculates the 8-bit expressible ratio and the 16-bit expressible ratio by using the tensor element number included in the input arithmetic operation result (step S317).

Next, the database update unit 142 stores the calculated 8-bit expressible ratio and 16-bit expressible ratio in the expressible ratio database 107 (step S318).

The arithmetic operation instruction unit 121 determines whether or not all the arithmetic operation processing in one iteration is completed according to whether or not the iteration completion notification is acquired from the arithmetic operation unit 103 (step S319). In a case where there is arithmetic operation processing that is not executed (step S319: no), the arithmetic operation instruction unit 121 returns to step S303.

On the other hand, in a case where all the arithmetic operation processing in one iteration has been completed (step S319: yes), the arithmetic operation instruction unit 121 determines whether or not deep learning is completed (step S320). In a case where deep learning is not completed (step S320: no), the arithmetic operation instruction unit 121 returns to step S302.

On the other hand, in a case where deep learning is completed (step S320: yes), the arithmetic operation instruction unit 121 notifies the completion of deep learning of the user application 101. Then, the arithmetic operation instruction unit 121 terminates deep learning including switching of the arithmetic data types.

As described above, the information processing apparatus according to the present embodiment obtains the expressible ratios with the 8-bit expressible ratio and the 16-bit expressible ratio of the element number included in the arithmetic operation result and switches the arithmetic data type according to the obtained 8-bit expressible ratio and 16-bit expressible ratio. In this way, since the arithmetic data type is automatically switched at the timing when expression by the 8-bit fixed point or the 16-bit fixed point can be sufficiently made, it is not necessary for an operator to designate a timing of the arithmetic data type by trial and error. Therefore, the information processing apparatus according to the present embodiment can easily improve a learning efficiency of deep learning and machine learning. Furthermore, since the arithmetic data type is switched based on the expressible element number, stagnation in learning due to insufficient arithmetic operation accuracy caused by insufficient previous learning can be reduced.

Note that the information processing apparatus according to the present embodiment may be configured to be able to select automatic switching to the 8-bit fixed point and the 16-bit fixed point or execution of all the arithmetic operations with the 32-bit floating point. In a case where the automatic switching to the 8-bit fixed point and the 16-bit fixed point is selected, the information processing apparatus executes processing similar to the above processing. On the other hand, in a case where the execution of all the arithmetic operations with the 32-bit floating point is selected, the information processing apparatus performs all the arithmetic operations with the 32-bit floating point without switching the arithmetic data type to the 8-bit fixed point until deep learning is completed.

Third Embodiment

Figure 14:
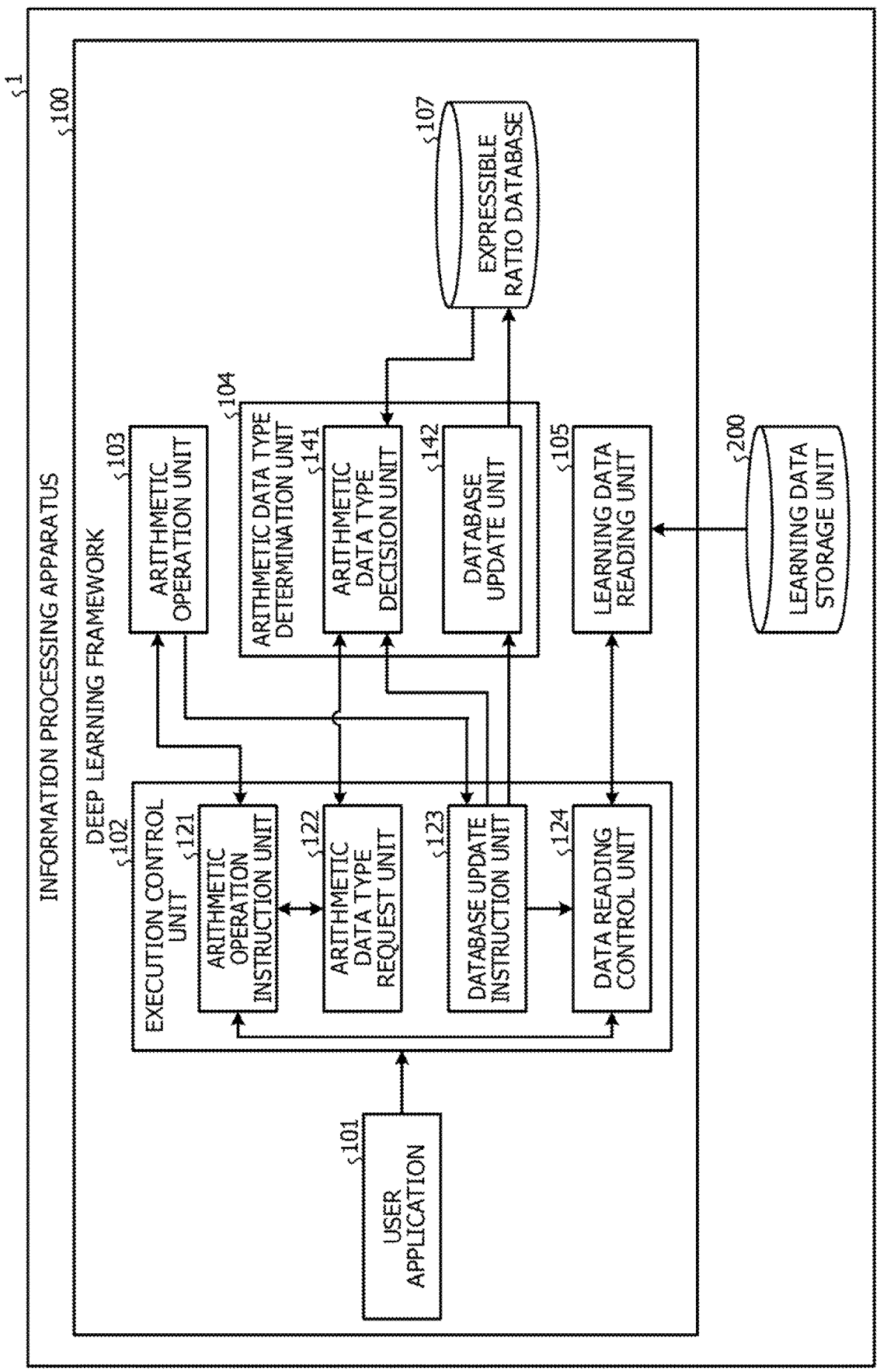
FIG. 14 is a block diagram of an information processing apparatus according to a third embodiment.

FIG. 14 is a block diagram of an information processing apparatus according to a third embodiment. An information processing apparatus 1 according to the present embodiment is different from that in the first and second embodiments in that the information processing apparatus 1 does not include an arithmetic data type database 106.

The information processing apparatus 1 according to the present embodiment is different from those in the first and second embodiments in that an arithmetic data type is determined for each iteration without referring to a previous arithmetic data type. For example, with the information processing apparatus 1 according to the present embodiment, there is a case where an arithmetic operation using the 8-bit fixed point as the arithmetic data type is returned to a state where the 16-bit fixed point and the 32-bit floating point are used as the arithmetic data types. Furthermore, there is a case where an arithmetic operation using the 16-bit fixed point as the arithmetic data type is returned to a state where the 32-bit floating point is used as the arithmetic data type.

In the following description, an example will be described in which the 8-bit fixed point and the 16-bit fixed point are used as in the second embodiment. However, the information processing apparatus 1 according to the third embodiment can operate in a case where the 8-bit fixed point similar to that in the first embodiment is used as a fixed point. In the following description, arithmetic data type determination processing will be mainly described. Description of a function of each unit similar to that in the second embodiment will be omitted.

An expressible ratio database 107 according to the present embodiment has a format similar to the format illustrated in FIG. 10. For example, in the expressible ratio database 107 according to the present embodiment, an expressible ratio by an 8-bit fixed point and an expressible ratio by a 16-bit fixed point of a tensor element number included in an arithmetic operation result are registered for each arithmetic operation of each iteration.

When receiving an instruction to perform deep learning from a user application 101, an execution control unit 102 instructs an arithmetic data type determination unit 104 to initialize the expressible ratio database 107. In this case, since the arithmetic data type database 106 does not exist, the arithmetic data type database 106 is not initialized.

In response to the instruction to initialize the expressible ratio database 107, the arithmetic data type determination unit 104 deletes data registered to the expressible ratio database 107 and initializes the expressible ratio database 107.

An arithmetic data type decision unit 141 receives an input of a request for acquiring an arithmetic data type used in each arithmetic operation from an arithmetic data type request unit 122. Next, the arithmetic data type decision unit 141 confirms the arithmetic data type database 106 and acquires a current arithmetic data type of each arithmetic operation. Then, the arithmetic data type decision unit 141 acquires an 8-bit expressible ratio in an iteration within a determination range from the expressible ratio database 107.

Next, the arithmetic data type decision unit 141 determines whether or not the 8-bit expressible ratio in the latest iteration for each arithmetic operation exceeds a ratio threshold. For example, in a case where the ratio threshold is set to Tf1, the arithmetic data type decision unit 141 determines whether or not the formula (3) is satisfied.

Regarding the arithmetic operation of which the expressible ratio exceeds the threshold, the arithmetic data type decision unit 141 determines whether or not a change in the 8-bit expressible ratio within the determination range is small. For example, the arithmetic data type decision unit 141 calculates a fluctuation $\Delta f$ between the iterations for an arithmetic operation f by using the formula (4).

Next, the arithmetic data type decision unit 141 determines whether or not the calculated fluctuation in the 8-bit expressible ratio is less than a fluctuation threshold. For example, in a case where the fluctuation threshold is set to Tf2, the arithmetic data type decision unit 141 determines whether or not the formula (5) is satisfied.

For the arithmetic operation of which the fluctuation in the 8-bit expressible ratio is less than the fluctuation threshold, the arithmetic data type decision unit 141 determines the arithmetic data type of the arithmetic operation as the 8-bit fixed point and notifies the determined arithmetic data type of the arithmetic data type request unit 122.

On the other hand, regarding the arithmetic operation of which the 8-bit expressible ratio is equal to or less than the ratio threshold and the arithmetic operation of which the fluctuation in the 8-bit expressible ratio is equal to or more than the predetermined fluctuation threshold, the arithmetic data type decision unit 141 acquires a 16-bit expressible ratio in the iteration within the determination range.

Next, the arithmetic data type decision unit 141 determines whether or not the 16-bit expressible ratio in the latest iteration for each arithmetic operation exceeds a ratio threshold. For example, in a case where the ratio threshold is set to Tf1, the arithmetic data type decision unit 141 determines whether or not the formula (3) is satisfied.

Regarding the arithmetic operation of which the expressible ratio exceeds the threshold, the arithmetic data type decision unit 141 determines whether or not a change in the 16-bit expressible ratio within the determination range is small. For example, the arithmetic data type decision unit 141 calculates a fluctuation Δf between the iterations for an arithmetic operation f by using the formula (4).

Next, the arithmetic data type decision unit 141 determines whether or not the calculated fluctuation in the 16-bit expressible ratio is less than a fluctuation threshold. For example, in a case where the fluctuation threshold is set to Tf2, the arithmetic data type decision unit 141 determines whether or not the formula (5) is satisfied. For the arithmetic operation of which the fluctuation in the 16-bit expressible ratio is less than the fluctuation threshold, the arithmetic data type decision unit 141 determines the arithmetic data type of the arithmetic operation as the 16-bit fixed point and notifies the determined arithmetic data type of the arithmetic data type request unit 122.

On the other hand, regarding the arithmetic operation of which the 16-bit expressible ratio is equal to or less than the ratio threshold and the arithmetic operation of which the fluctuation in the 16-bit expressible ratio is equal to or more than the predetermined fluctuation threshold, the arithmetic data type decision unit 141 determines the arithmetic data type of the arithmetic operation as the 32-bit floating point. Then, the arithmetic data type decision unit 141 notifies, of the arithmetic data type request unit 122, that the 32-bit floating point is used as the arithmetic data type of the arithmetic operation.

Here, arithmetic data type transition according to the present embodiment will be described with reference to FIG. 15. FIG. 15 is a diagram for explaining the arithmetic data type transition. A table 172 in FIG. 15 is a table in which the expressible ratio database 107 is rearranged for easy understanding. Here, arithmetic data type determination processing by the arithmetic data type decision unit 141 in a case where the ratio threshold is set to 80% and the fluctuation threshold is set to 10% will be described.

First, arithmetic data type transition in the arithmetic operation #1 will be described. Since the 8-bit expressible ratio of the arithmetic operation #1 is equal to or less than the ratio threshold at the time of an iteration having the iteration ID of it1505, the arithmetic data type decision unit 141 does not use the 8-bit fixed point as an arithmetic data type of the arithmetic operation #1. On the other hand, the 16-bit expressible ratio in the iteration having the iteration ID of it1505 in the use range 721 exceeds the ratio threshold, and the fluctuation in the 16-bit expressible ratio is less than the fluctuation threshold. Therefore, the arithmetic data type decision unit 141 sets the 16-bit fixed point as the arithmetic data type of the arithmetic operation #1. Therefore, the 16-bit fixed point is used as the arithmetic data type of the arithmetic operation #1 in an iteration having the iteration ID of it1506, and a ratio 722 is calculated by using the 16-bit fixed point.

Thereafter, both of the 8-bit expressible ratio and the 16-bit expressible ratio are equal to or less than the ratio threshold at the time of an iteration having the iteration ID of it1507. Furthermore, a fluctuation in the 16-bit expressible ratio in the use range 723 is equal to or more than the fluctuation threshold. Therefore, the arithmetic data type decision unit 141 sets the 32-bit floating point as the arithmetic data type of the arithmetic operation #1. With this operation, after an iteration having the iteration ID of it1508, the 32-bit floating point is used as the arithmetic data type of the arithmetic operation #1 if the arithmetic data type is not changed.

Next, arithmetic data type transition in the arithmetic operation #2 will be described. Both of the 8-bit expressible ratio and the 16-bit expressible ratio exceed the ratio threshold as in the use range 724 at the time of the iteration having the iteration ID of it1504, and each fluctuation is less than the fluctuation threshold. Therefore, the arithmetic data type decision unit 141 sets the 8-bit fixed point as the arithmetic data type of the arithmetic operation #2. With this operation, in an iteration in a range 725 after the iteration having the iteration ID of it1505, the 8-bit fixed point is used as the arithmetic data type of the arithmetic operation #2 if the arithmetic data type is not changed.

Next, arithmetic data type transition in the arithmetic operation #3 will be described. Both of the 8-bit expressible ratio and the 16-bit expressible ratio exceed the ratio threshold as in a use range 726 at the time of the iteration having the iteration ID of it1504, and each fluctuation is less than the fluctuation threshold. Therefore, the arithmetic data type decision unit 141 sets the 8-bit fixed point as the arithmetic data type of the arithmetic operation #2. As a result, a ratio 727 of the iteration having the iteration ID of it1505 is calculated by using the 8-bit fixed point.

However, at the time of the iteration having the iteration ID of it1506, in a use range 728, the 8-bit available ratio of the iteration having the iteration ID of it1506 is equal to or less than the ratio threshold, and a fluctuation in the 8-bit available ratio is equal to or less than the fluctuation threshold. Therefore, the arithmetic data type decision unit 141 does not use the 8-bit fixed point as the arithmetic data type of the arithmetic operation #3. On the other hand, in a use range 729, the 16-bit expressible ratio in the iteration having the iteration ID of it1506 is larger than the ratio threshold, and the fluctuation in the 16-bit expressible ratio is less than the fluctuation threshold. Therefore, the arithmetic data type decision unit 141 sets the 16-bit fixed point as the arithmetic data type of the arithmetic operation #3. With this operation, in an iteration in a range 730 after the iteration having the iteration ID of it1507, the 16-bit fixed point is used as the arithmetic data type of the arithmetic operation #3 if the arithmetic data type is not changed.

Figure 16:
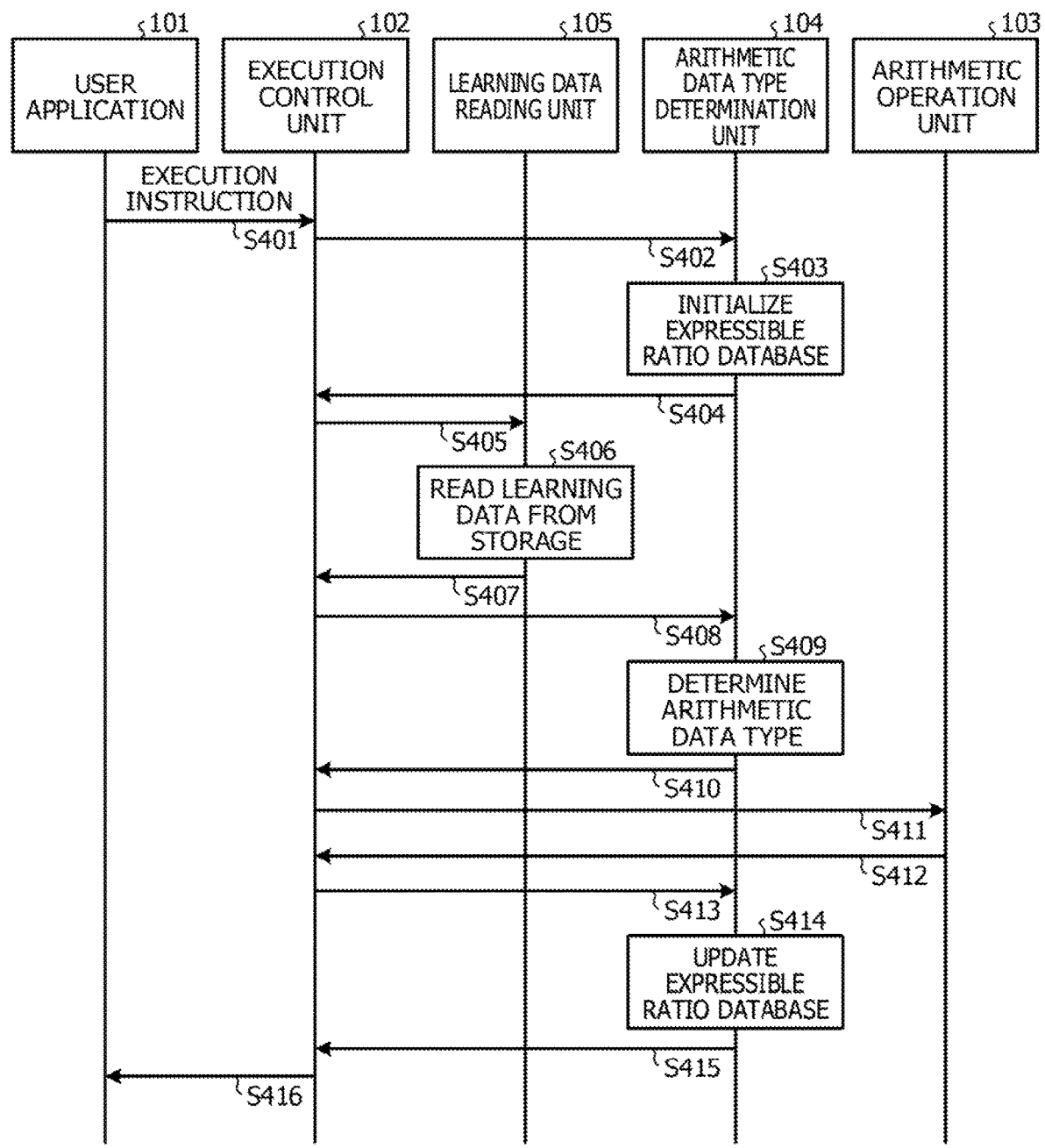
FIG. 16 is a sequence diagram of arithmetic data type determination processing by the information processing apparatus according to the third embodiment.

Next, an outline of an entire flow of arithmetic data type determination processing by the information processing apparatus 1 according to the third embodiment will be described with reference to FIG. 16. FIG. 16 is a sequence diagram of the arithmetic data type determination processing by the information processing apparatus according to the third embodiment.

The user application 101 outputs an instruction to perform deep learning to the execution control unit 102 (step S401).

When receiving the instruction to perform deep learning from the user application 101, the execution control unit 102 instructs the arithmetic data type determination unit 104 to initialize the expressible ratio database 107 (step S402).

In response to the instruction to initialize the expressible ratio database 107, the arithmetic data type determination unit 104 deletes data registered to the expressible ratio database 107 and initializes the expressible ratio database 107 (step S403).

Thereafter, the arithmetic data type determination unit 104 notifies the completion of the initialization of the expressible ratio database 107 of the execution control unit 102 (step S404).

When receiving the response indicating the completion of the initialization of the expressible ratio database 107, the execution control unit 102 instructs a learning data reading unit 105 to read the learning data used for learning (step S405).

In response to the instruction to read the learning data, the learning data reading unit 105 reads designated learning data from a learning data storage unit 200 (step S406).

Thereafter, the learning data reading unit 105 transmits the read learning data to the execution control unit 102 (step S407).

The execution control unit 102 acquires the learning data from the learning data reading unit 105. Next, the execution control unit 102 outputs a request for acquiring the arithmetic data type used in each arithmetic operation in the next iteration to the arithmetic data type determination unit 104 (step S408).

When receiving the request to acquire the arithmetic data type, the arithmetic data type determination unit 104 determines the arithmetic data type used in each arithmetic operation by using the expressible ratio database 107 (step S409).

Then, the arithmetic data type determination unit 104 outputs a notification indicating the determined arithmetic data type used in each arithmetic operation to the execution control unit 102 (step S410).

The execution control unit 102 acquires the arithmetic data type to be used in each arithmetic operation. Then, the execution control unit 102 outputs the acquired learning data to the arithmetic operation unit 103 and further notifies the arithmetic data type used in each arithmetic operation of the arithmetic operation unit 103 and makes the arithmetic operation unit 103 perform the arithmetic operation (step S411).

Thereafter, the execution control unit 102 receives an input of the arithmetic operation result from the arithmetic operation unit 103 (step S412).

Next, the execution control unit 102 outputs the acquired arithmetic operation result to the arithmetic data type determination unit 104 and instructs to update the expressible ratio database 107 (step S413).

The arithmetic data type determination unit 104 calculates an expressible ratio by using the tensor element number included in the arithmetic operation result, registers the calculated expressible ratio, and updates the expressible ratio database 107 (step S414).

Thereafter, the arithmetic data type determination unit 104 outputs a notification indicating the update completion of the expressible ratio database 107 to the execution control unit 102 (step S415).

The execution control unit 102 receives the input of the notification indicating the update completion of the arithmetic data type database 106 from the execution control unit 102. The execution control unit 102, the arithmetic operation unit 103, the arithmetic data type determination unit 104, and the learning data reading unit 105 repeat steps S111 to S121 until all the arithmetic operations included in one iteration are completed. Moreover, the execution control unit 102, the arithmetic operation unit 103, the arithmetic data type determination unit 104, and the learning data reading unit 105 repeat steps S108 to S121 until deep learning is completed. Thereafter, the execution control unit 102 notifies the completion of deep learning of the user application 101 (step S416).

Figure 17A:
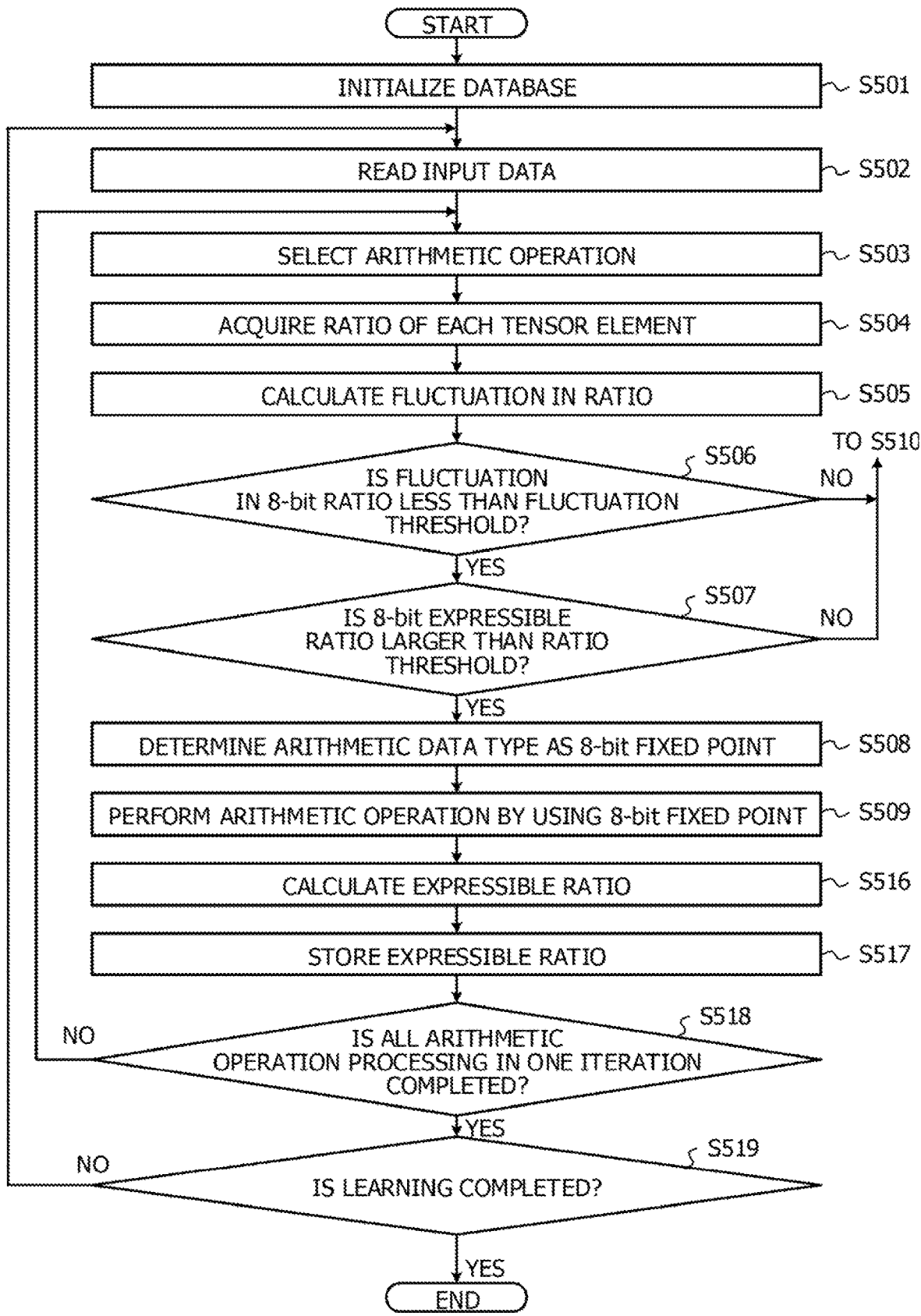
FIGS. 17A and 17B are a flowchart of the arithmetic data type determination processing according to the third embodiment.
Figure 17B:
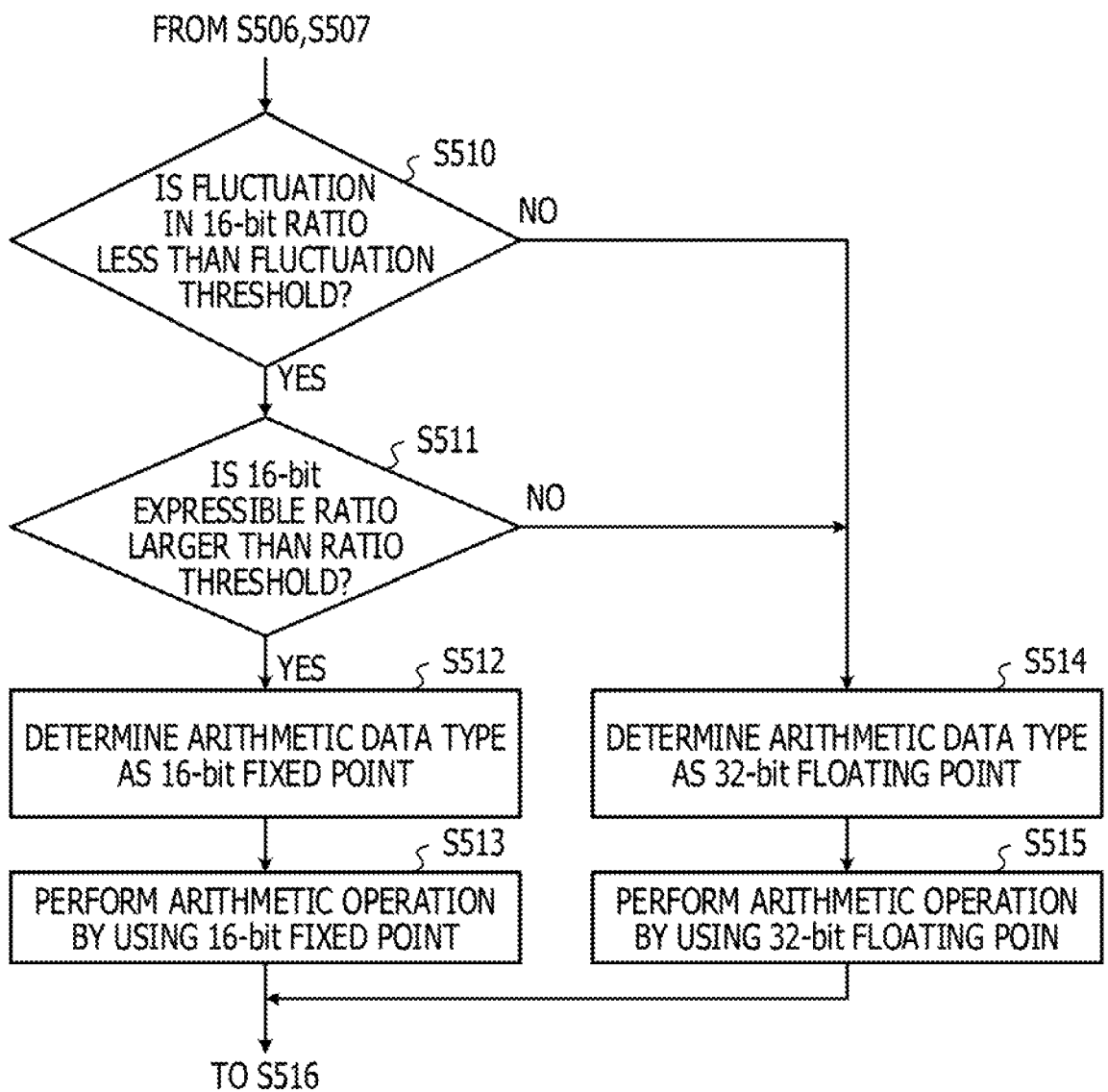

Next, a detailed flow of the arithmetic data type determination processing according to the third embodiment will be described with reference to FIGS. 17A and 17B. FIGS. 17A and 17B are a flowchart of the arithmetic data type determination processing according to the third embodiment.

The arithmetic data type determination unit 104 initializes the expressible ratio database 107 (step S501).

The data reading control unit 124 receives a notification indicating the initialization completion of the database from the database update instruction unit 123. Furthermore, the data reading control unit 124 receives a request for acquiring the learning data from the arithmetic operation instruction unit 121. Then, the data reading control unit 124 outputs a request for reading the learning data to the learning data reading unit 105. In response to the request for reading the learning data, a learning data reading unit 105 reads designated learning data from the learning data storage unit 200 (step S502). Thereafter, the learning data reading unit 105 outputs the read learning data to the data reading control unit 124. The data reading control unit 124 outputs the acquired learning data to the arithmetic operation instruction unit 121.

The arithmetic operation instruction unit 121 selects a next arithmetic operation in an iteration from the instruction to perform deep learning input from the user application 101 (step S503).

Then, the arithmetic operation instruction unit 121 outputs a request for acquiring an arithmetic data type used in the selected arithmetic operation to the arithmetic data type decision unit 141. Upon receiving the acquisition request, the arithmetic data type decision unit 141 acquires an 8-bit expressible ratio and a 16-bit expressible ratio in an iteration within a use range of the selected arithmetic operation from the expressible ratio database 107 (step S504). However, in a case where the iteration is not proceeded and iterations within the use range are not obtained, the arithmetic data type decision unit 141 determines that an error occurs in the acquisition of the expressible ratio.

Next, the arithmetic data type decision unit 141 calculates fluctuations in the 8-bit expressible ratio and the 16-bit expressible ratio by using the acquired 8-bit expressible ratio and 16-bit expressible ratio in the formula (4) (step S505). However, in a case where an error occurs in the acquisition of the expressible ratio, the arithmetic data type decision unit 141 does not calculate the fluctuation in the expressible ratio and remains the fluctuation to be uncalculated.

Next, the arithmetic data type decision unit 141 determines whether or not a fluctuation in the 8-bit expressible ratio is less than the fluctuation threshold (step S506).

In a case where the fluctuation in the 8-bit expressible ratio is less than the fluctuation threshold (step S506: yes), the arithmetic data type decision unit 141 determines whether or not the latest 8-bit expressible ratio is larger than the ratio threshold (step S507).

In a case where the latest 8-bit expressible ratio is larger than the ratio threshold (step S507: yes), the arithmetic data type decision unit 141 determines the arithmetic data type as the 8-bit fixed point (step S508).

Thereafter, the arithmetic data type decision unit 141 notifies, of the arithmetic operation instruction unit 121, that the 8-bit fixed point is used as the arithmetic data type of the selected arithmetic operation. The arithmetic operation instruction unit 121 makes the arithmetic operation unit 103 perform the selected arithmetic operation by using the 8-bit fixed point (step S509).

On the other hand, in a case where the fluctuation in the 8-bit expressible ratio is not less than the fluctuation threshold (step S506: no) or in a case where the latest 8-bit expressible ratio is equal to or less than the ratio threshold (step S507: no), the arithmetic data type decision unit 141 executes the following processing. Here, in a case where the fluctuation in the 8-bit expressible ratio is not calculated, the arithmetic data type decision unit 141 determines that the fluctuation is not less than the fluctuation threshold. The arithmetic data type decision unit 141 determines whether or not a fluctuation in the 16-bit expressible ratio is less than the fluctuation threshold (step S510).

In a case where the fluctuation in the 16-bit expressible ratio is less than the fluctuation threshold (step S510: yes), the arithmetic data type decision unit 141 determines whether or not the latest 16-bit expressible ratio is larger than the ratio threshold (step S511).

In a case where the latest 16-bit expressible ratio is larger than the ratio threshold (step S511: yes), the arithmetic data type decision unit 141 determines the arithmetic data type as the 16-bit fixed point (step S512).

Thereafter, the arithmetic data type decision unit 141 notifies, of the arithmetic operation instruction unit 121, that the 16-bit fixed point is used as the arithmetic data type of the selected arithmetic operation. The arithmetic operation instruction unit 121 makes the arithmetic operation unit 103 perform the selected arithmetic operation by using the 16-bit fixed point (step S513).

On the other hand, in a case where the fluctuation in the 16-bit expressible ratio is not less than the fluctuation threshold (step S510: no) or in a case where the latest 16-bit expressible ratio is equal to or less than the ratio threshold (step S511: no), the arithmetic data type decision unit 141 executes the following processing. The arithmetic data type decision unit 141 determines the arithmetic data type of the selected arithmetic operation as the 32-bit floating point (step S514). Here, in a case where the fluctuation in the 16-bit expressible ratio is not calculated, the arithmetic data type decision unit 141 determines that the fluctuation is not less than the fluctuation threshold.

Then, the arithmetic data type decision unit 141 notifies, of the arithmetic operation instruction unit 121, that the 32-bit floating point is used as the arithmetic data type of the selected arithmetic operation. The arithmetic operation instruction unit 121 makes the arithmetic operation unit 103 perform the selected arithmetic operation by using the 32-bit floating point (step S515).

Thereafter, the arithmetic data type request unit 122 acquires the arithmetic operation result of the selected arithmetic operation from the arithmetic operation unit 103. Then, the arithmetic data type request unit 122 outputs the acquired arithmetic operation result to the database update unit 142 and instructs to update the expressible ratio database 107. The database update unit 142 calculates the 8-bit expressible ratio and the 16-bit expressible ratio by using the tensor element number included in the input arithmetic operation result (step S516).

Next, the database update unit 142 stores the calculated 8-bit expressible ratio and 16-bit expressible ratio in the expressible ratio database 107 (step S517).

The arithmetic operation instruction unit 121 determines whether or not all the arithmetic operation processing in one iteration is completed according to whether or not the iteration completion notification is acquired from the arithmetic operation unit 103 (step S518). In a case where there is arithmetic operation processing that is not executed (step S518: no), the arithmetic operation instruction unit 121 returns to step S503.

On the other hand, in a case where all the arithmetic operation processing in one iteration has been completed (step S518: yes), the arithmetic operation instruction unit 121 determines whether or not deep learning is completed (step S519). In a case where deep learning is not completed (step S519: no), the arithmetic operation instruction unit 121 returns to step S502.

On the other hand, in a case where learning is completed (step S519: yes), the arithmetic operation instruction unit 121 notifies the completion of deep learning of the user application 101. Then, the arithmetic operation instruction unit 121 terminates deep learning including switching of the arithmetic data types.

As described above, the information processing apparatus according to the present embodiment determines the arithmetic data type for each iteration without referring to the previous arithmetic data type. As a result, occurrence of a state where learning does not proceed due to insufficient arithmetic operation accuracy after switching the arithmetic data type to the 8-bit fixed point or the 16-bit fixed point can be reduced, and learning accuracy can be improved.

Note that the information processing apparatus according to the present embodiment also may be configured to be able to select automatic switching to the 8-bit fixed point and the 16-bit fixed point or execution of all the arithmetic operations with the 32-bit floating point. In a case where the automatic switching to the 8-bit fixed point and the 16-bit fixed point is selected, the information processing apparatus executes processing similar to the above processing. On the other hand, in a case where the execution of all the arithmetic operations with the 32-bit floating point is selected, the information processing apparatus performs all the arithmetic operations with the 32-bit floating point without switching the arithmetic data type to the 8-bit fixed point until deep learning is completed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
perform an iteration operation, which repeats an arithmetic operation a predetermined times using sequentially a calculated arithmetic operation result obtained by the arithmetic operation using an arithmetic operation target, a plurality of times;
obtain, for each iteration operation, a ratio of a first number of first elements in an expressible range as a predetermined-bit fixed point among second elements included in each calculated arithmetic operation result of each arithmetic operation of the predetermined times with respect to a second number of the second elements;
store, in the memory, the ratio in association with the corresponding arithmetic operation and the corresponding iteration operation; and
perform the arithmetic operation by using the predetermined-bit fixed point based on the ratio stored in the memory.

2. The information processing apparatus according to claim 1, wherein the processor is configured to:
determine a decimal point position based on the second number; and obtain the ratio of the first number as the predetermined-bit fixed point with the decimal point position.

3. The information processing apparatus according to claim 1, wherein the processor is configured to:
perform the arithmetic operation by using the predetermined-bit fixed point in a case where the ratio is larger than a predetermined ratio threshold.

4. The information processing apparatus according to claim 1, wherein the processor is configured to:
obtain the ratio each time when calculating the arithmetic operation result; and
perform the arithmetic operation by using the predetermined-bit fixed point based on a change in the ratio between a latest ratio and a predetermined-times previous ratio.

5. The information processing apparatus according to claim 1, wherein the processor is configured to:
perform the arithmetic operation by using a first predetermined-bit fixed point or a second predetermined-bit fixed point based on the ratio.

6. The information processing apparatus according to claim 1, wherein the processor is configured to:
perform the arithmetic operation by using a floating point based on the ratio.

7. A control method comprising:
performing, by an information processing apparatus, an iteration operation, which repeats an arithmetic operation a predetermined times using sequentially a calculated arithmetic operation result obtained by the arithmetic operation using an arithmetic operation target, a plurality of times;
obtaining, for each iteration operation, a ratio of a first number of first elements in an expressible range as a predetermined-bit fixed point among second elements included in each calculated arithmetic operation result of each arithmetic operation of the predetermined times with respect to a second number of the second elements;
storing, in a memory, the ratio in association with the corresponding arithmetic operation and the corresponding iteration operation; and
making the information processing apparatus perform the arithmetic operation by using the predetermined-bit fixed point based on the calculated ratio stored in the memory.

8. A non-transitory computer-readable recording medium having stored therein a control program for causing a computer to execute a process comprising:
performing an iteration operation, which repeats an arithmetic operation a predetermined times using sequentially a calculated arithmetic operation result obtained by the arithmetic operation using an arithmetic operation target plurality of times;
obtaining, for each iteration operation, a ratio of a first number of first elements in an expressible range as a predetermined-bit fixed point among second elements included in each calculated arithmetic operation result of each arithmetic operation of the predetermined times with respect to a second number of the second elements;
storing, in a memory, the ratio in association with the corresponding arithmetic operation and the corresponding iteration operation; and
performing the arithmetic operation by using the predetermined-bit fixed point based on the calculated ratio stored in the memory.

* * * * *